(12) United States Patent
Kanamori et al.

(10) Patent No.: US 7,878,569 B2
(45) Date of Patent: Feb. 1, 2011

(54) AUTOMOBILE

(75) Inventors: Jun Kanamori, Shizuoka-ken (JP); Osamu Fujimoto, Aichi-ken (JP)

(73) Assignees: Kanto Auto Works, Ltd., Kanagawa-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 219 days.

(21) Appl. No.: 12/103,913

(22) Filed: Apr. 16, 2008

(65) Prior Publication Data

US 2008/0265606 A1  Oct. 30, 2008

(30) Foreign Application Priority Data

Apr. 27, 2007  (JP) .............. 2007-120021

(51) Int. Cl.
*B60N 2/00* (2006.01)

(52) U.S. Cl. .............................. 296/65.05; 297/340

(58) Field of Classification Search .............. 296/65.01, 296/65.05; 297/340
See application file for complete search history.

(56) References Cited

U.S. PATENT DOCUMENTS

| 4,215,899 | A |   | 8/1980 | Schmidt et al. |
| 6,073,986 | A |   | 6/2000 | Neale et al. |
| 6,209,943 | B1 | * | 4/2001 | Neale et al. ............... 296/65.01 |
| 6,631,946 | B1 | * | 10/2003 | Neale ........................ 297/15 |
| 6,981,731 | B2 | * | 1/2006 | Welch et al. ................. 296/68 |
| 2003/0214145 | A1 |   | 11/2003 | Schambre et al. |
| 2004/0222657 | A1 |   | 11/2004 | Welch et al. |
| 2005/0200151 | A1 |   | 9/2005 | Welch et al. |
| 2008/0284214 | A1 |   | 11/2008 | Neale |
| 2009/0015049 | A1 | * | 1/2009 | Kanamori et al. ........... 297/340 |

FOREIGN PATENT DOCUMENTS

| EP | 0987140 | 7/2009 |
| JP | 2001-130303 | 5/2001 |
| JP | 2004-106640 | 8/2004 |
| WO | WO 98/41419 | 9/1998 |
| WO | WO 99/62738 | 12/1999 |

OTHER PUBLICATIONS

European Search Report dated May 28, 2009, from the European Application No. 08155231.

* cited by examiner

*Primary Examiner*—Glenn Dayoan
*Assistant Examiner*—Melissa A Black
(74) *Attorney, Agent, or Firm*—Hoffmann & Baron, LLP

(57) ABSTRACT

In an automobile having a seat cushion 13 and a seat back 12 to be stored in an upper part of a vehicle interior, the seat cushion 13 and the seat back 12 can be lifted easily to the upper part position of the vehicle interior. The seat cushion 13 is rotatably coupled to the seat back 12 so that the seat cushion 13 can be superposed on the seat back 12, the seat back 12 is supported on a vehicle body 1 so that the superposed seat cushion 13 and seat back 12 can be rotated to the upper part of the vehicle interior, and a rear surface 12B of the seat back 12 is provided with a handle arm 16 that is grabbed by an operator to lift up the seat back 12 and the seat cushion 13 to the upper part of the vehicle interior.

3 Claims, 12 Drawing Sheets

Fig.5
(a)
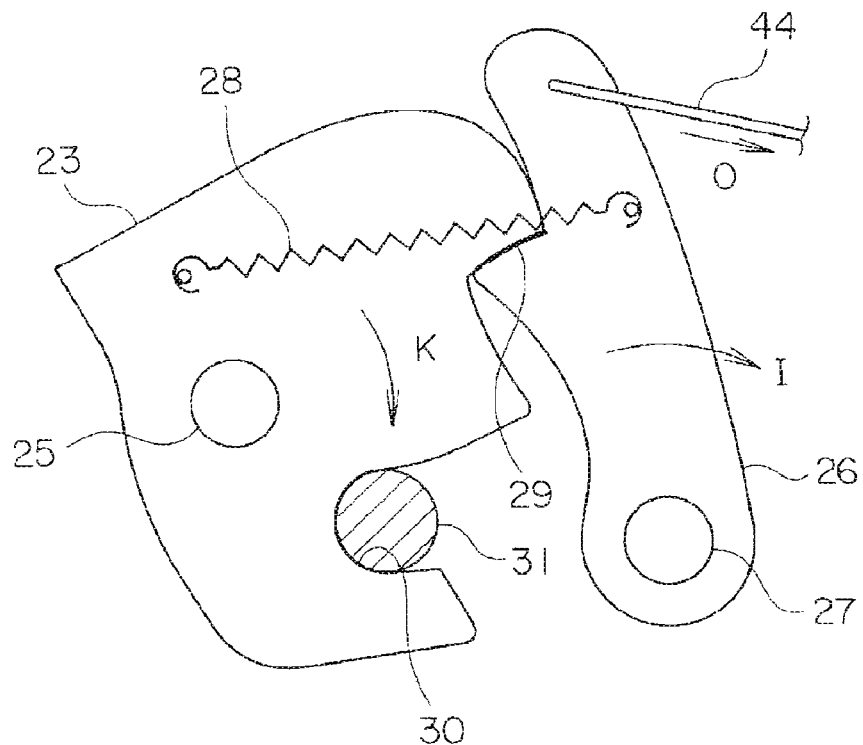
(b)
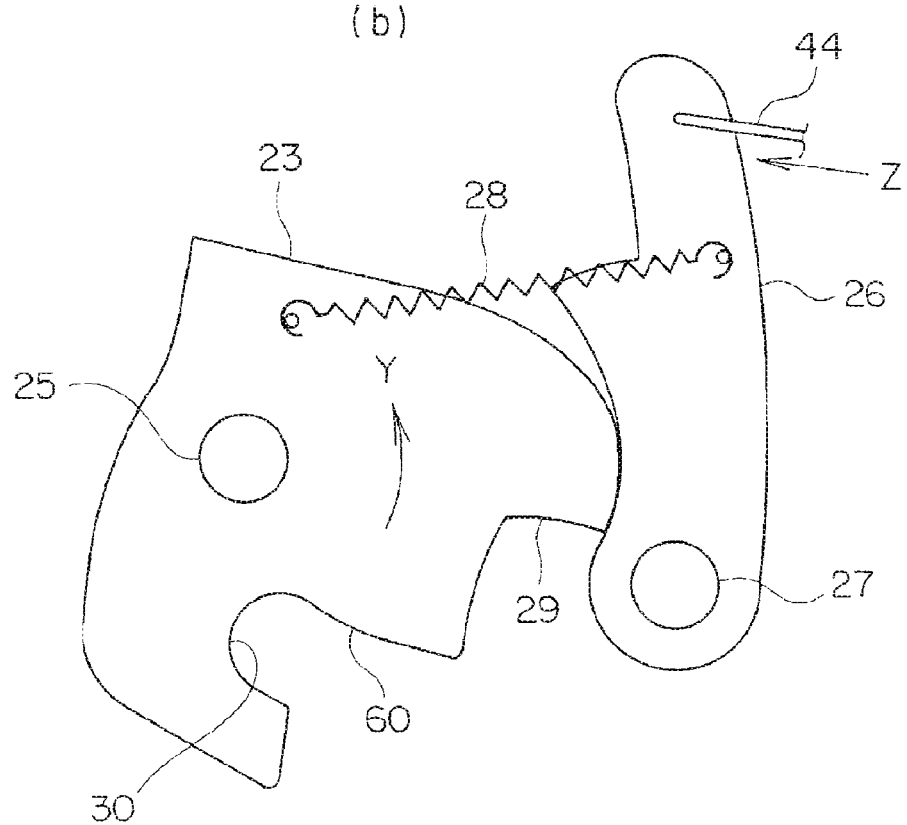

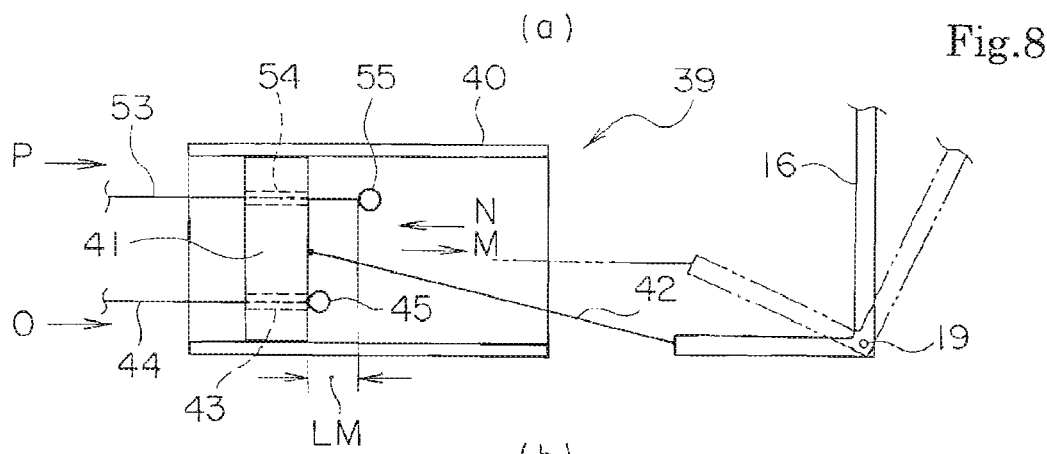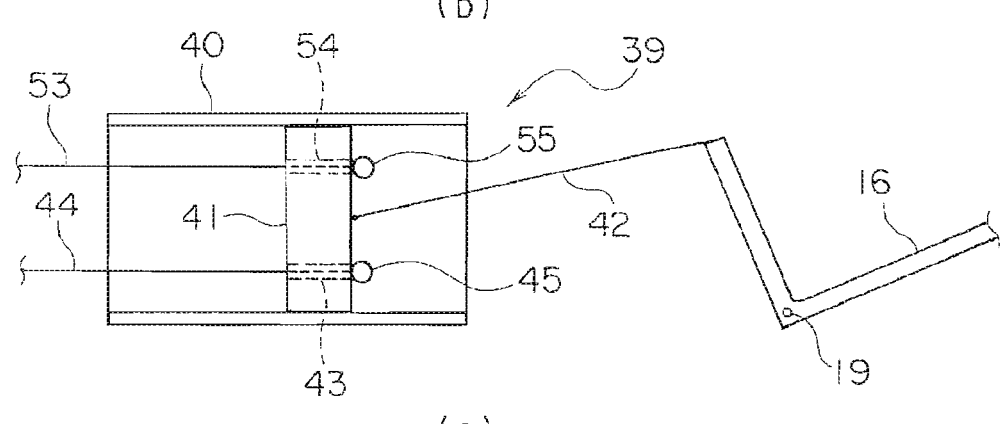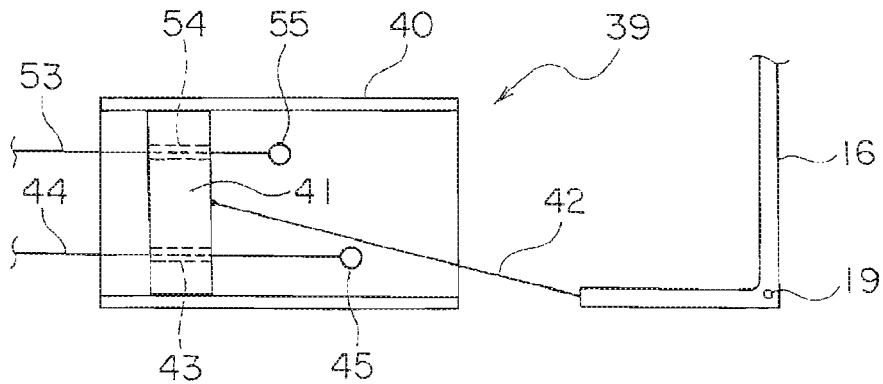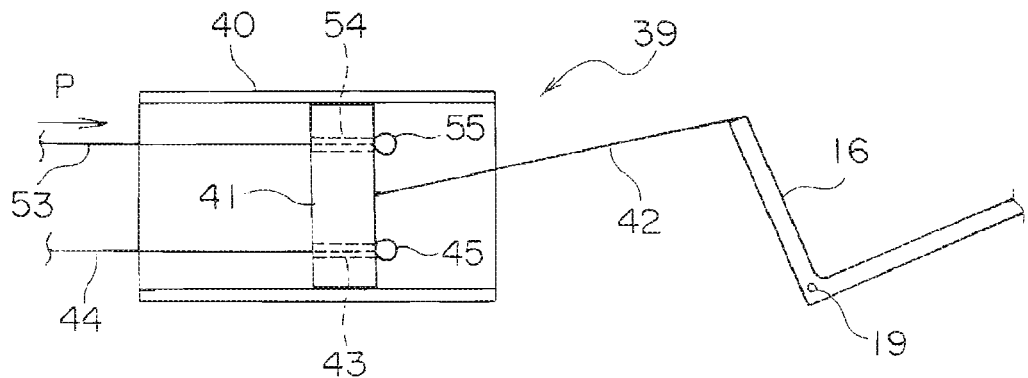
Fig.8

Fig.9
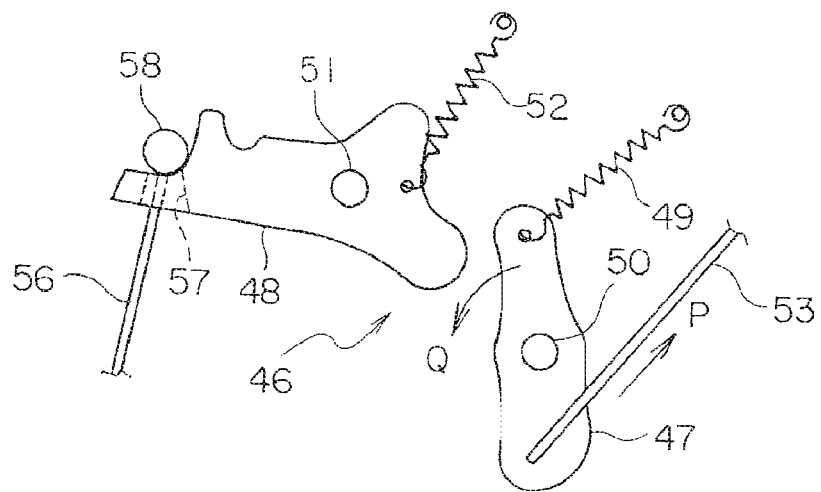
(a)
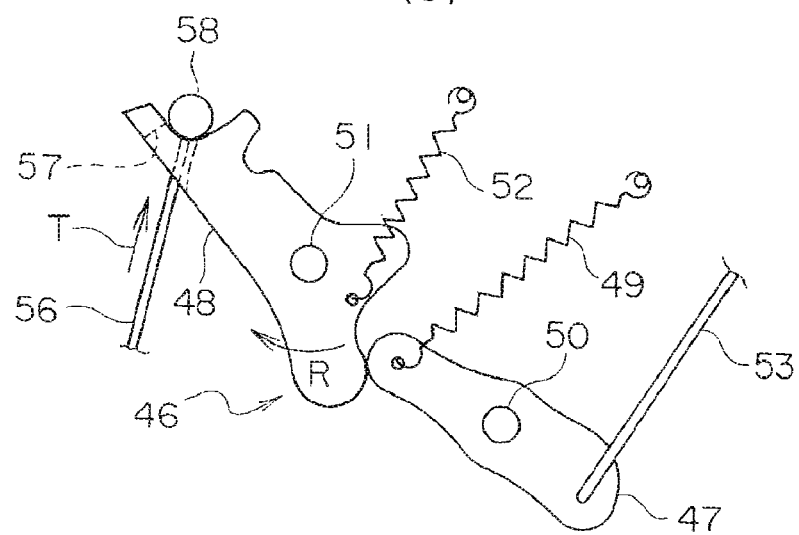
(b)
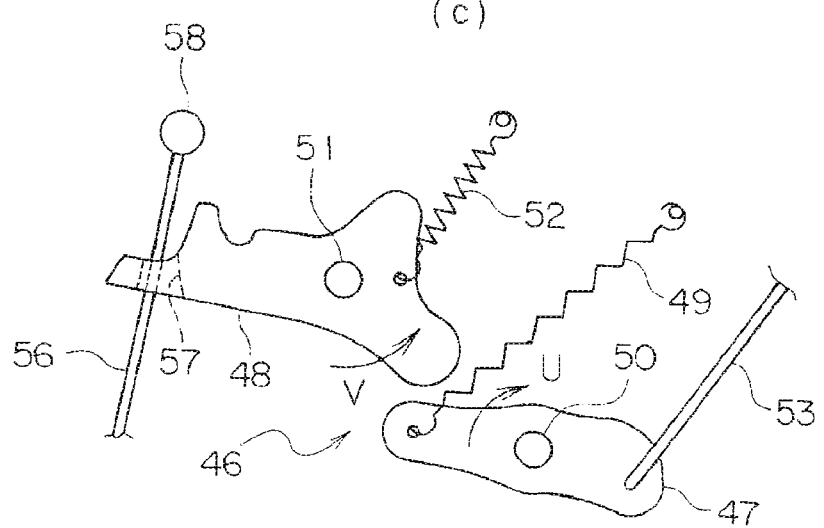
(c)

Fig.10
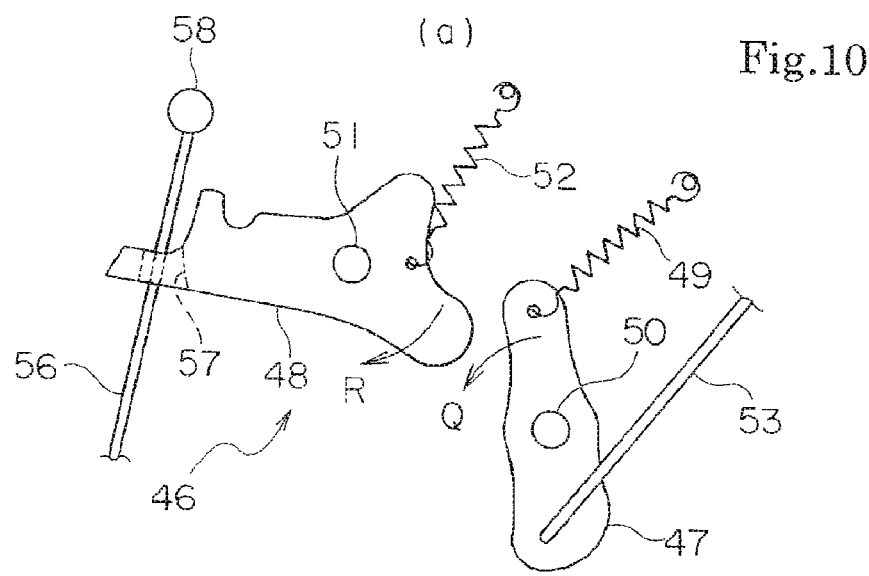
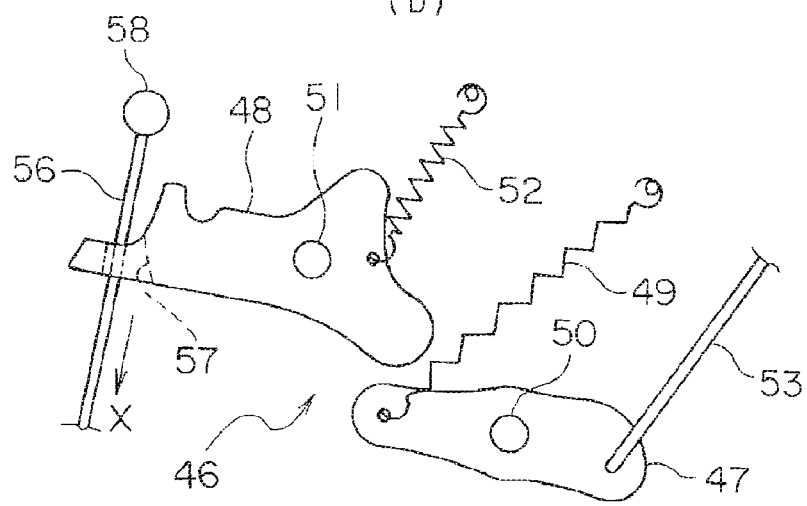
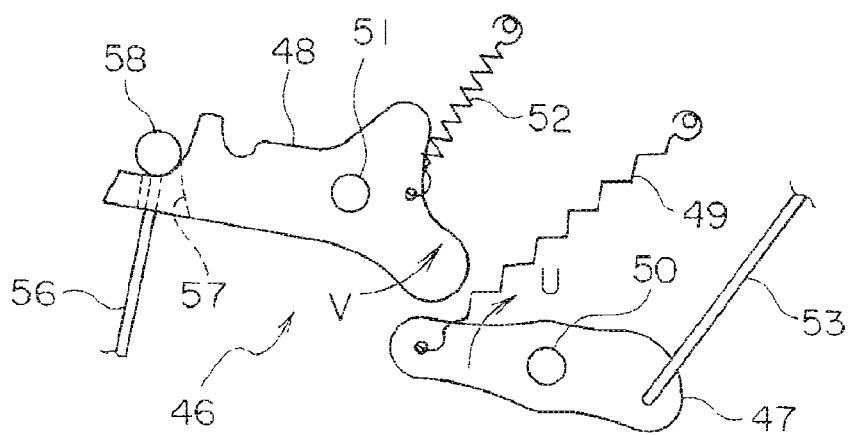

Fig.12
(a)
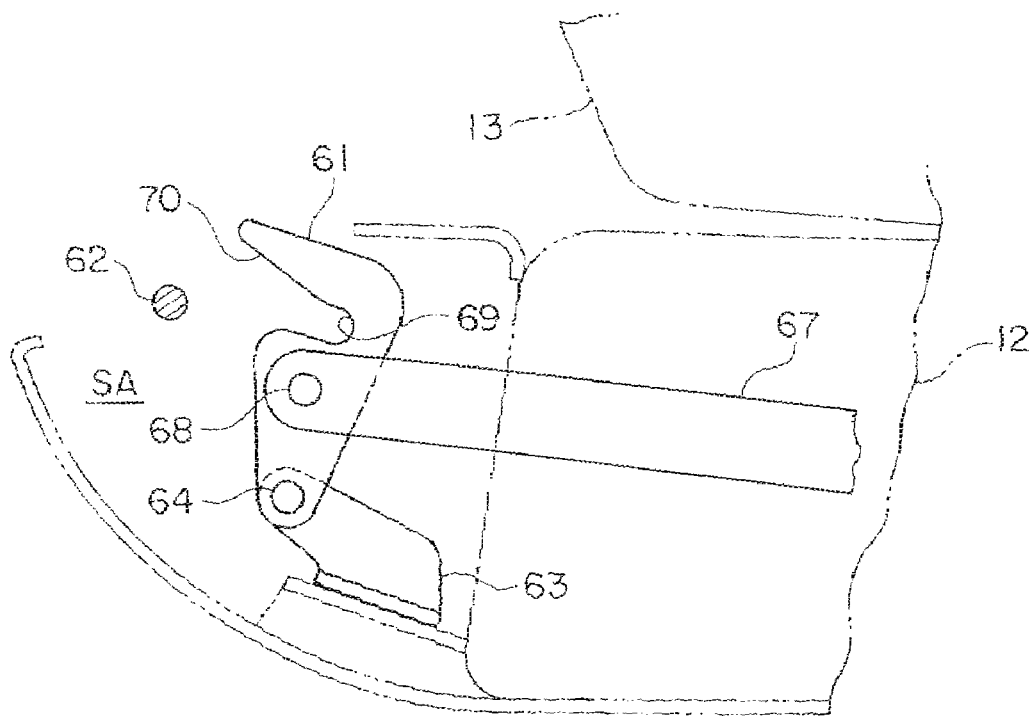
(b)
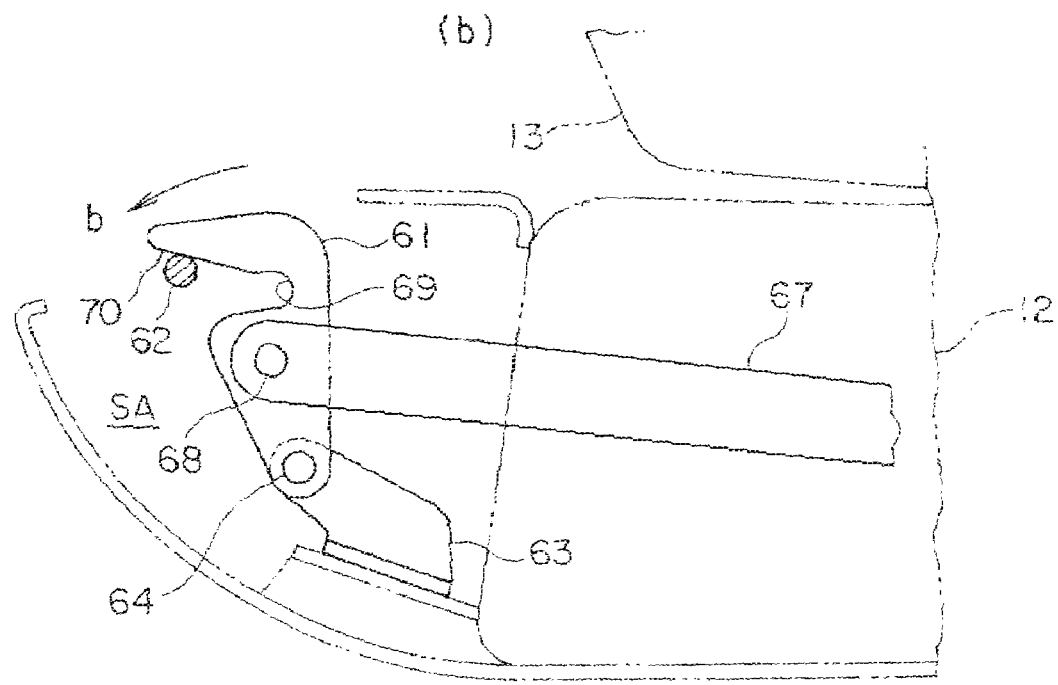

AUTOMOBILE

BACKGROUND OF THE INVENTION

1. Field of the Invention

The present invention relates to an automobile, which comprises a seat disposed in a vehicle interior and having a seat back for supporting the back of the seated person and a seat cushion for supporting the hip of the seated person, and the seat cushion and seat back of which are capable of being folded up into a superposed form and being stored in an upper part of the vehicle interior.

2. Description of the Related Art

In an automobile of the form described above, the seat cushion and seat back are capable of being stored in the upper part of the vehicle interior to secure a large space below, where the luggage can be stored in. See Laid-open Japanese Patent Application (Publication number 2001-130303). However, the conventional vehicles of this type have been suffering from the disadvantage of not being able to lift a seat up and down easily due to the poor operability in lifting up the folded seat cushion and seat back to the upper part of the vehicle interior or lifting them down.

SUMMARY OF THE INVENTION

It is an object of the present invention to provide an automobile of the form described above, the seat cushion and seat back of which can be easily lifted up and down to and from an upper part of a vehicle interior.

To achieve the above object, the present invention provides an automobile having a seat that is disposed within a vehicle interior and has a seat back supporting the back of a seated person and a seat cushion supporting the hip of the seated person. The seat cushion is coupled to the seat back so as to be rotatable between a use position where the seated person can be seated and a non-use position where the seat cushion is superposed on the seat back, while the seat back is supported on a vehicle body so as to be rotatable between a use position where the seat back can support the back of the seated person and a non-use position where the seat back and the seat cushion are lifted up to an upper part of the vehicle interior in a state in which the seat cushion is superposed on the seat back. The seat cushion is positioned on the seat back in a superposed manner when the seat back is in the non-use position. A handle arm is provided on a seat back rear surface that is the opposite side of a seat back supporting surface supporting the back of the seated person, and a base end portion of the handle arm, which becomes the bottom of the handle arm when the seat back is in the use position, is rotatably coupled to the seat back in such a way that the handle arm rotates between a storage position where the handle arm is positioned along the seat back rear surface and a use position where the free end of the handle arm is separated from the seat back rear surface.

It is advantageous that the seat is provided with a first locking member that is engaged with a first striker fixed to the vehicle body and thereby locks the seat cushion to the vehicle body when the seat cushion is in the use position, a second locking member that is engaged with a second striker fixed to the vehicle body and thereby locks the seat back to the vehicle body when the seat back is in the use position, and lock releasing means for releasing locks applied by the first and second locking members to the seat cushion and the seat back by interlocking with rotation of the handle arm, so as to release the lock applied by the first locking member to the seat cushion first and thereafter release the lock applied by the second locking member to the seat back in accordance with the rotation of the handle arm when the handle arm is rotated from the storage position toward the use position.

It is advantageous that the first locking member is supported on the seat cushion so as to be rotatable between a locking position where an engaging concave portion of the first locking member is engaged with the first striker to lock the seat cushion to the vehicle body and a lock releasing position where the engaging concave portion of the first locking member is removed from the first striker to release the lock of the seat cushion to the vehicle body, the second locking member is supported on the seat back so as to be rotatable between a locking position where an engaging concave portion of the second locking member is engaged with the second striker to lock the seat back to the vehicle body and a lock releasing position where the engaging concave portion of the second locking member is removed from the second striker to release the lock of the seat back to the vehicle body. The lock releasing means includes a first pawl, which is supported on the seat cushion so as to be rotatable between an engaging position where the first pawl is engaged with an engaging portion of the first locking member to hold the first locking member at the locking position thereof and an engagement releasing position where the first pawl is removed from the engaging portion of the first locking member to allow the first locking member to rotate to the lock releasing position, a second pawl, which is supported on the seat back so as to be rotatable between an engaging position where the second pawl is engaged with an engaging portion of the second locking member to hold the second locking member at the locking position thereof and an engagement releasing position where the second pawl is removed from the engaging portion of the second locking member to allow the second locking member to rotate to the lock releasing position, first spring means for biasing the first locking member toward the lock releasing position thereof, and biasing the first locking member and the first pawl in a direction in which the first locking member and the first pawl are engaged with each other, second spring means for biasing the second locking member toward the lock releasing position thereof, and biasing the second locking member and the second pawl in a direction in which the second locking member and the second pawl are engaged with each other, a slider, which is supported on the seat back so as to be movable between a initial position and an actuated position, first coupling means for coupling the slider to the handle arm in such a way that the slider occupies the initial position thereof when the handle arm is in the storage position and that the slider occupies the actuated position thereof when the handle arm is rotated to the use position thereof, second coupling means for coupling the slider to the first pawl in such a way that, in a state in which the seat back is locked to the use position thereof by the second locking member and in which the seat cushion is locked to the use position thereof by the first locking member, the handle arm starts rotating from the storage position thereof and when the handle arm reaches a position between the storage position and the use position and accordingly the slider moves to a position between the initial position and the actuated position thereof, the first pawl is removed from the engaging portion of the first locking member to rotate to the engagement releasing position and thereby the first locking member is allowed to rotate to the lock releasing position by the action of the first spring means, but the first pawl is caused to remain in the engagement releasing position thereof even when the handle arm rotates from the use position to the storage position thereof and accordingly the slider returns to the initial position thereof in a state in which the first locking member occupies the lock releasing position, a first rotating arm, which is supported on the seat back so as to be rotatable between an initial position and a terminal position, third coupling means for coupling the slider to the first rotating arm in such a way that the first rotating arm rotates from the initial position to the terminal position thereof when the slider moves from the initial position to the actuated position thereof, third spring means for biasing the first rotating arm in a direction in which the first rotating arm rotates to the initial position thereof, a second rotating arm supported rotatable on the seat back, fourth spring means for biasing the second rotating arm in a direction in which the second rotating arm rotates to an initial position thereof, and fourth coupling means for coupling the second rotating arm to the second pawl in such a way that, the handle arm starts rotating from the storage position thereof in a state in which the seat back is locked to the use position thereof by the second locking member, and when the first rotating arm, which starts rotating from the initial position to the terminal position, presses the second rotating arm occupying the initial position thereof to rotate the second rotating arm the second pawl is removed from the engaging portion of the second locking member to rotate to the engagement releasing position and thereby the second locking member is allowed to rotate to the lock releasing position by the action of the second spring means, but the second pawl is caused to remain in the engagement releasing position thereof even when the second rotating arm is rotated to the initial position thereof by the action of the fourth spring means in a state in which the second locking member occupies the lock releasing position. The positions of the first and second rotating arms are set in such a way that, when the first rotating arm rotates from the initial position to the terminal position thereof, the first rotating arm presses and thereby rotates the second rotating arm, and thereafter the first rotating arm passes the second rotating arm to release pressing on the second rotating arm, and accordingly the second rotating arm is rotated to the initial position thereof by the action of the fourth spring means, and in such a way that, when the first rotating arm rotates from the terminal position to the initial position thereof, the first rotating arm presses and thereby rotates the second rotating arm, and thereafter the first rotating arm passes the second rotating arm to return to the initial position of the first rotating arm. The second coupling means, the third coupling means, and the slider regulate a timing at which the first pawl starts rotating and a timing at which the first rotating arm starts rotating, in such a way that the first pawl is removed from the engaging portion of the first locking member first and thereafter the second pawl is removed from the engaging portion of the second locking member, when the handle arm starts rotating from the storage position toward the use position thereof in a state in which the seat back is locked to the use position thereof by the second locking member and in which the seat cushion is locked to the use position thereof by the first locking member, and the slider moves from the initial position to the actuated position thereof. When the seat back rotates from the non-use position to the use position thereof, the second locking member collides with the second striker and thereby rotates, whereby the engaging concave portion of the second locking member is brought into engagement with the second striker and the second pawl is brought into engagement with the engaging portion of the second locking member by the action of the second spring means, so that the seat back is locked to the vehicle body. When the seat cushion rotates from the non-use position to the use position thereof, the first locking member collides with the first striker and thereby rotates, whereby the engaging concave portion of the first locking member is brought into engagement with the first striker and the first pawl is brought into engagement with the engaging portion of the first locking member by the action of the first spring means, so that the seat cushion is locked to the vehicle body.

It is advantageous that the first coupling means includes a first wire, both end portions of which are fixed to the handle arm and the slider respectively, the second coupling means includes a second wire, one end portion of which is fixed to the first pawl while the other end portion passes through the slider so as to be relatively slidable with respect to the slider and has a small block fixed thereto, the third coupling means includes a third wire, one end portion of which is fixed to the first rotating arm while the other end portion passes through the slider so as to be relatively slidable with respect to the slider and has a small block fixed thereto, and the fourth coupling means includes a fourth wire, one end portion of which is fixed to the second pawl while the other end portion passes through the second rotating arm so as to be relatively slidable with respect to the second rotating arm and has a small block fixed thereto. In a state in which the seat back is locked to the use position thereof by the second locking member, while the seat cushion is locked to the use position thereof by the first locking member, and in which the handle arm occupies the storage position thereof, the small block fixed to the other end portion of the second wire is positioned closer to the slider occupying the initial position, compared to the small block fixed to the other end portion of the third wire, and when the handle arm is rotated from the storage position to the use position thereof and accordingly the slider moves from the initial position to the actuated position thereof, the slider abuts on the small block fixed to the other end of the second wire and firstly pulls the second wire to remove the first pawl from the engaging portion of the first locking member, and after starting pulling the second wire, the slider abuts on the small block fixed to the other end portion of the third wire and pulls the third wire to rotate the first rotating arm and the second rotating arm from the respective initial positions thereof, and the second rotating arm applies pressure to the small block fixed to the fourth wire abutting on the second rotating arm to pull the fourth wire, and accordingly the second pawl is removed from the engaging portion of the second block member.

It is advantageous that the automobile includes a third locking member, which is engaged with a third striker fixed to the vehicle body and thereby locks the seat back to the vehicle body when the seat back is in the non-use position thereof, and is supported on the seat back so as to be rotatable between a locking position where an engaging concave portion of the third locking member is engaged with the third striker to lock the seat back to the non-use position thereof and a lock releasing position where the engaging concave portion is removed from the third striker to release the lock of the seat back to the vehicle body. The seat back is provided with interlocking means for rotating the third locking member by interlocking with the rotation of the handle arm in such a way that the third locking member occupies the lock releasing position thereof when the handle arm is in the use position thereof, and that the third locking member occupies the locking position thereof when the handle arm is rotated to the storage position thereof.

It is advantageous that a guide face is formed on the third locking member, which brings the engaging concave portion of the third locking member into engagement with the third striker while being in sliding contact with the third striker when the handle arm is rotated from the use position to the storage position thereof to rotate the third locking member from the lock releasing position toward the locking position thereof, in a situation where the seat back is rotated from the use position to the non-use position thereof and then stops upon reaching a position immediately before the non-use position thereof in a state in which the handle arm is brought to the use position thereof.

According to the present invention, because the handle arm capable of rotating between the storage position and the use position is provided on the rear surface of the seat back, after superposing the seat cushion on the seat back an operator can put his hand on the handle arm located in the use position thereof and easily rotate the seat cushion and seat back to the upper part of the vehicle interior or rotate the seat cushion and seat back downward.

BRIEF DESCRIPTION OF THE DRAWINGS

FIG. 5 is a drawing for explaining the actions of a first locking member and a first pawl.

FIG. 8 is a drawing for explaining the operations of a handle arm and a slider.

FIG. 9 is a drawing for explaining the operations of first and second rotating arms.

FIG. 10 is a drawing for explaining the operations of the first and second rotating arms.

FIG. 12 is a drawing for explaining the functions of a guide face formed in the third locking member.

DETAILED DESCRIPTION OF THE INVENTION

The embodiment of the present invention will be described hereinafter in detail with reference to the drawings.

Figure 1:
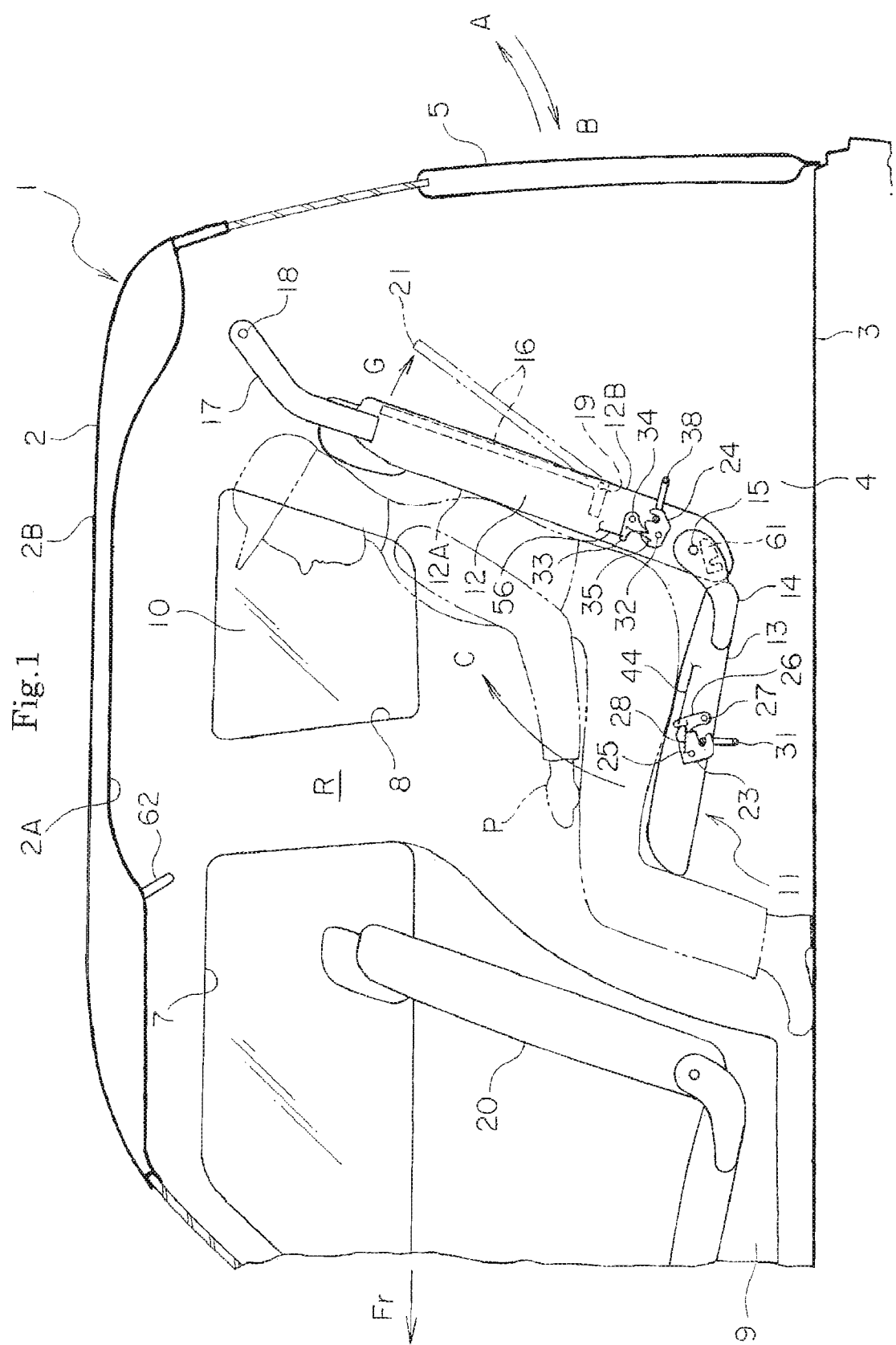
FIG. 1 is a schematic longitudinal sectional view of an automobile, showing the inside of a vehicle interior in which a seat back and a seat cushion are in use positions thereof.
Figure 2:
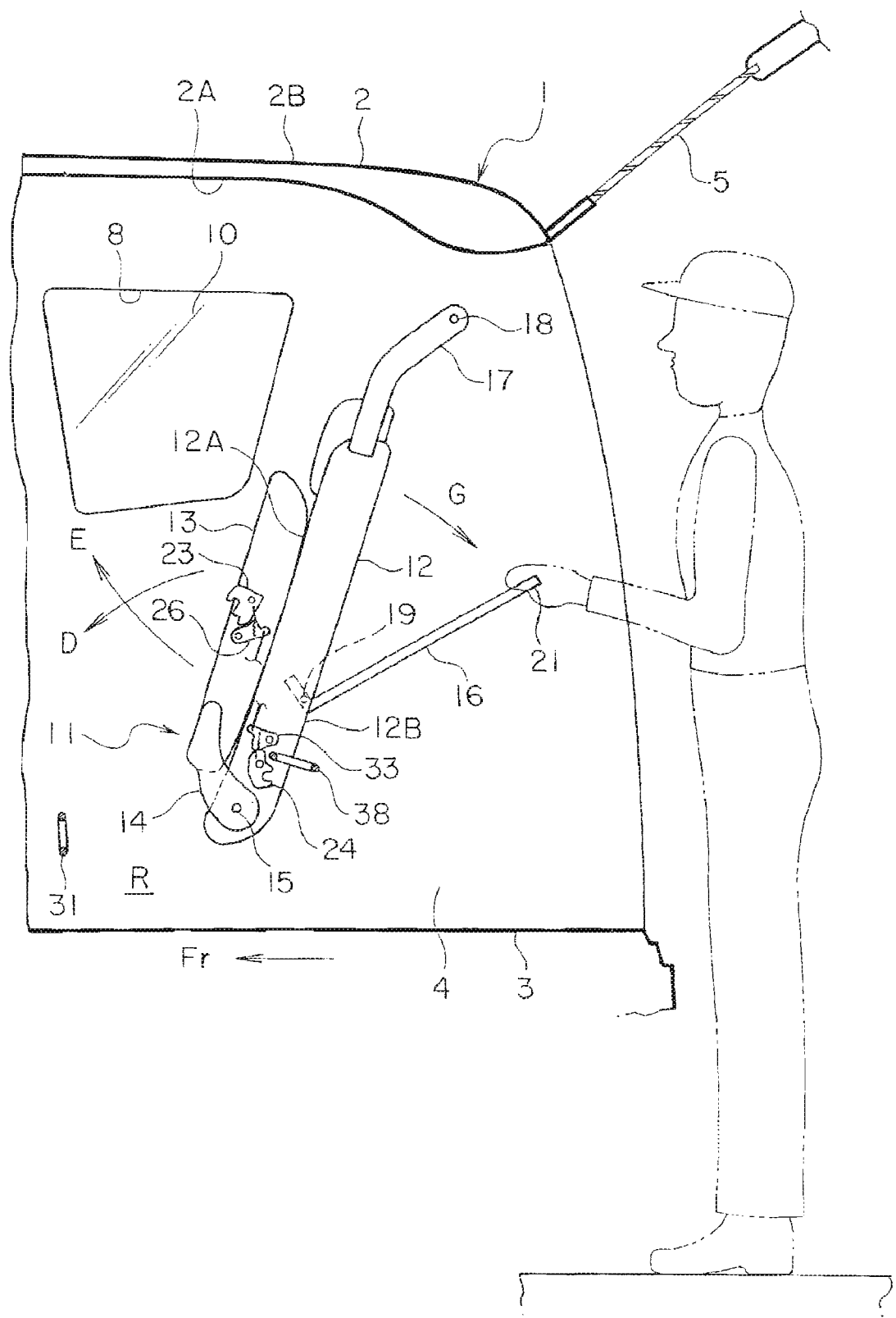
FIG. 2 is a schematic longitudinal sectional view similar to that of FIG. 1, showing a situation where the seat cushion is rotated to a non-use position thereof so as to be superposed on the seat back.
Figure 3:
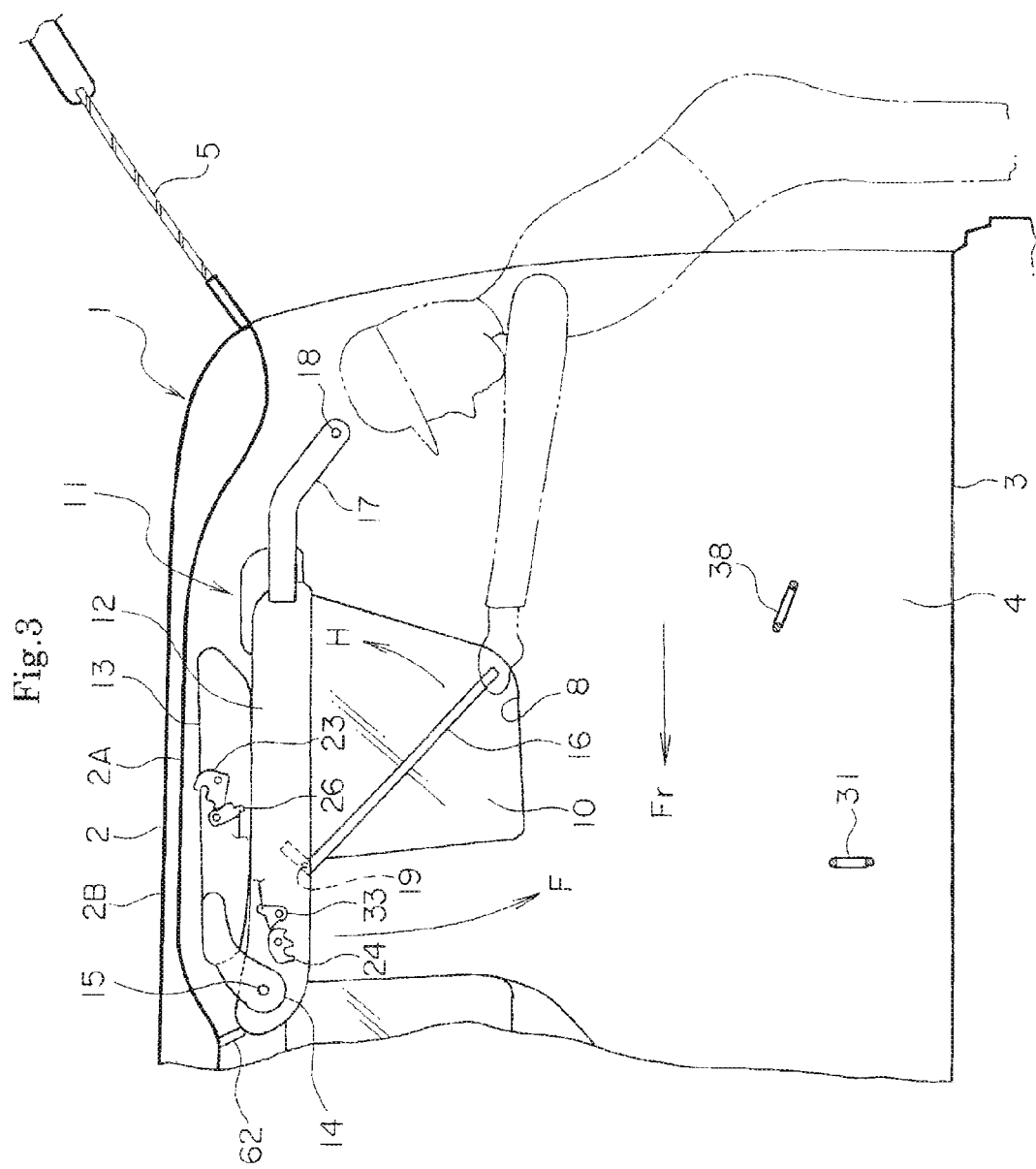
FIG. 3 is a schematic longitudinal sectional view similar to that of FIG. 1, showing a situation where the seat back is brought to the non-use position in the upper part of the vehicle interior.
Figure 4:
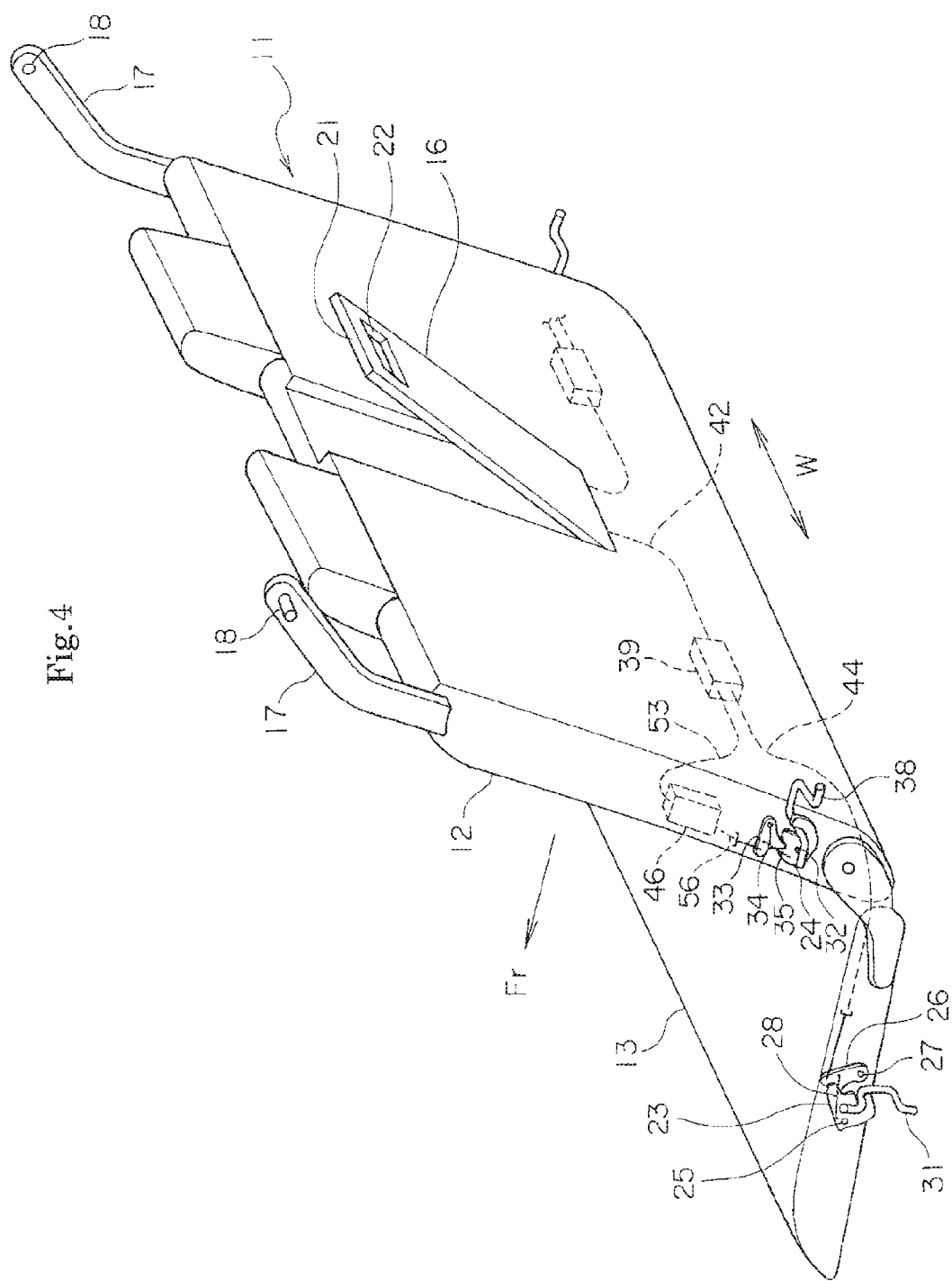
FIG. 4 is a perspective view showing a diagonal rear portion of a seat.

FIGS. 1 through 3 are schematic longitudinal sectional views of an automobile illustrating the inside of a vehicle interior thereof. An arrow Fr shown in each of these drawings indicates a forward direction of the automobile, and a direction that is perpendicular to this forward direction Fr and normal to the paper surface of each of FIGS. 1 through 3 is a vehicle width direction. In FIG. 4 the vehicle width direction is indicated by an arrow W. "Front" and "rear" (or equivalent expressions thereof) as used in the present specification and claims mean front and rear with respect to the forward movement direction Fr of the automobile.

As is commonly know, a vehicle body 1 of the automobile shown in FIG. 1, i.e., the main body of the automobile, is constituted by various panels such as a roof panel 2 constituting the upper part of the vehicle body 1, a floor panel 3 constituting the floor surface of a vehicle interior R, and side panels 4 constituting both side parts in the vehicle width direction of the vehicle interior R. FIGS. 1 through 3 each shows only one of the side panels 4. The roof panel 2 includes an inner panel 2A and an outer panel 2B that are firmly fixed and integrated with each other. A rear door 5 is disposed in a rear opening of the vehicle body 1, and this rear door 5 is supported by the vehicle body 1 so as to be able to rotatably open and close in directions indicated by the arrows A and B in FIG. 1. Moreover, a side door 9 that is supported by the vehicle body 1 so as to be able to rotatably open and close is disposed in a door opening 7 formed in each side panel 4 of the vehicle body 1, and a window pane 10 is disposed in a window opening 8 formed rearwardly away from the side door 9. Also, a surface of the side panel 4 on the inside of the vehicle interior can be covered with an interior material, which is not shown, and a surface of the inner panel 2A of the roof panel 2 on the inside of the vehicle interior can be covered with a ceiling material, which is also not shown.

A seat 20 constituted in the form of a front seat and a seat 11 constituted in the form of a rear seat disposed rearwardly away from the front seat are disposed in the vehicle interior R. The seat 11 has, as shown in FIG. 1, a seat back 12 supporting the back of a seated person and a seat cushion 13 supporting the hip of the seated person. A seated person P on the seat 11 is shown by a two-dot chain line in FIG. 1.

FIG. 1 shows a state in which the seat cushion 13 and the seat back 12 occupy their use positions, wherein the seat cushion 13 maintains a substantially horizontal posture, while the seat back 12 is kept standing substantially perpendicularly to the seat cushion 13.

A hinge pin 15 fixed to a seat back frame (not shown) of the seat back 12 is provided on each of the side parts in the vehicle width direction of the seat back that is disposed underneath the seat back 12 when the seat back 12 occupies the use position. Furthermore, each of the side parts in the vehicle width direction of the seat cushion 13 is provided with a bracket 14 that is firmly fixed to the cushion frame (not shown). A hole formed on each bracket 14 is fitted to each hinge pin 15 so as be able to rotate relatively. On the other hand, as shown in FIG. 4 as well, one end portion of each of arms 17 is fixed to an upper part of each side part in the vehicle width direction of the seat back 12, and the other end portion of the each arm is rotatably coupled to each side panel 4 of the vehicle body 1 via a pivot pin 18. When the seat cushion 13 and the seat back 12 are in the use positions shown in FIG. 1, the seat cushion 13 and the seat back 12 are locked to the vehicle body 1 by after-described the first and second locking members 23 and 24 and the first and second strikers 31 and 38 engaged therewith, as described hereinafter, so that the seat cushion 13 can support the hip of the seated person P and the seat back 12 can support the back of the seated person P.

When the lock to the seat cushion 13 is released, the seat cushion 13 rotates around the hinge pin 15 of the seat back 12 in a direction indicated by the arrow C in FIG. 1 by means of the action of a spiral spring (not shown), which is one example of first biasing means provided around the hinge pin 15, and thereby occupies the position where it is superposed on the seat back 12 positioned at the use position as shown in FIG. 2. The position of the seat cushion 13 at this time constitutes a non-use position thereof. Moreover, when the lock to the seat back 12 is released, the seat back 12 rotates forward, along with the seat cushion 13, around the pivot pin 18 as shown by the arrow E in FIG. 2 by means of a gas damper stay (not shown), which is one example of second biasing means provided between the seat back 12 and the vehicle body 1, and thereby occupies the position where the seat back 12 is lifted up to the upper part of the vehicle interior R as shown in FIG. 3. The position of the seat back 12 at this time constitutes the non-use position thereof. At this time, the seat cushion 13 is superposed on the seat back 12, and the seat back 12 is locked to the vehicle body 1 by a third locking member 61 and a third striker 62 shown in FIG. 1, and held in the non-use position along with the seat cushion 13. The third locking member 61 and the third striker 62 will be described herein after in detail.

The gas damper stay is an apparatus which includes a cylinder, a piston slidably disposed in the cylinder and a piston rod. One end of the piston rod is fixed to the piston, and the other end of the piston rod is pivotally connected to the arm 17 fixed to the seat back 12. An end of cylinder away from the piston rod is pivotally connected to the vehicle body 1. The seat back 12 is biased to the non-use position by a gas pressure in the cylinder.

As described above, since the seat 11 is stored in the upper part of the vehicle interior R, a large space can be secured below the seat 11, and luggage (not shown) can be stored in this space efficiently. The seat 11 can be brought to the use position as shown in FIG. 1 by performing the reverse operation to the operation described above, and this seat 11 can be used. Specifically, the lock applied by the abovementioned third locking member 61 is released, and thereafter the seat back 12 is caused to rotate around the pivot pin 18 in a direction indicated by the arrow F in FIG. 3 and brought to the position shown in FIG. 2. Next, the seat cushion 13 is caused to rotate around the hinge pin 15 in a direction indicated by the arrow D in FIG. 2 and brought to the position shown in FIG. 1. The seat back 12 and the seat cushion 13 occupy the use positions in this manner, and the seat cushion 13 and the seat back 12 at this time are locked to the vehicle body 1 by the first and second locking members 23 and 24 and the first and second strikers 31 and 38, respectively.

As described above, the automobile of present embodiment has the seat 11 disposed within the vehicle interior R, and this seat 11 has the seat back 12 supporting the back of the seated person P and the seat cushion 13 supporting the hip of the seated person P. The seat cushion 13 is coupled to the seat back 12 so as to be rotatable between the use position where the seated person P can sit and the non-use position where the seat cushion 13 is superposed on the seat back 12. The seat back 12 is supported on the vehicle body so as to be rotatable between the use position where the back of the seated person P can be supported and the non-use position where the seat cushion 13 is superposed on the seat back 12 and the seat back 12 is lifted up along with the seat cushion 13 to the upper part of the vehicle interior R. When the seat back 12 is in the non-use position, the seat cushion 13 is positioned in a state in which it is superposed on the seat back 12, and the seat cushion 13 and the seat back 12 maintain substantially horizontal postures.

Furthermore, in the automobile of present embodiment, the seat back 12 is provided with a handle arm 16 for the purpose of improving the operability in folding up the seat back 12 and the seat cushion 13 as shown in FIG. 2 to lift the seat back 12 and the seat cushion 13 up to the upper part of the vehicle interior as shown in FIG. 3 and, conversely, to lift the seat back 12 and the seat cushion 13 down to the position shown in FIG. 2. As shown in FIG. 1, when the surface of the seat back 12, which supports the back of the seated person P sitting on the seat 11, is called "seat back supporting surface 12A" and the surface that is an opposite side of this seat back supporting surface 12A is called "seat back rear surface 12B," the handle arm 16 is provided on the seat back rear surface 12B. Moreover, a base end portion of the handle arm 16, which becomes the bottom of the handle arm 16 by bringing the seat back 12 to the use position shown in FIG. 1, is rotatably coupled to the seat back frame of the seat back 12 via a pin 19. Moreover, as shown in FIG. 4, a hole 22 is formed in a free end 21 of the handle arm 16, and a handle portion of the handle arm 16 is constituted in the form of this hole 22.

When the seated person P sits on the seat 11 to use the seat 11 in a state in which the seat cushion 13 and the seat back 12 are locked in the use positions shown in FIG. 1, the handle arm 16 is stored in a storage position located along the seat back rear surface 12B as shown by a dashed line in FIG. 1. At this time, the handle arm 16 is held in the storage position thereof by a locking device, not shown. A locking claw that is rotatably supported on the seat back rear surface 12B can be used as this locking device. The handle arm 16 placed in the storage position is held and locked using the locking claw, and the locking claw can be separated from the handle arm 16 by rotating the locking claw, in order to release the lock to the handle arm 16.

Prior to lifting up the seat back 12 and the seat cushion 13 to the upper part of the vehicle interior, the rear door 5 shown in FIG. 1 is rotated in the direction indicated by the arrow A in FIG. 1 to bring the rear door 5 to an opened position shown in FIG. 2. Next, the operator shown by a two-dot chain line in FIG. 2 inserts his hands to the opening of the rear part of the vehicle body that is opened by opening the rear door 5, rotates the abovementioned locking claw, releases the lock of the handle arm 16, hooks his fingers through the hole 22 (FIG. 4) of the handle arm 16, rotates the handle arm 16 in a direction in which the free end 21 thereof moves rearward as shown by the arrow G in FIG. 1, and then rotates the handle arm 16 to the use position shown in FIG. 2. At this time, the handle arm 16 abuts on a stopper (not shown) provided on the seat back 12, and held in the use position. The situation in which the handle arm 16 is rotated to an intermediate position between the storage position and the use position is shown by the two-dot chain line in FIG. 1. In addition, FIG. 4 shows a situation where the handle arm 16 is rotated to this intermediate position.

After the handle arm 16 is brought to the use position to release locks applied by the first and second locking members 23 and 24 to the seat cushion 13 and the seat back 12 as described hereinafter, and after the seat cushion 13 is rotated to the non-use position shown in FIG. 2, the operator can rotate the seat back 12 and the seat cushion 13 in a direction indicated by the arrow E and lift them up to the non-use position shown in FIG. 3 by means of the action of the abovementioned gas damper stay, by gently pushing the handle arm 16 toward the front of the vehicle body 1 while grabbing the handle arm 16. Subsequently, the operator rotates the handle arm 16 in a direction indicated by the arrow H in FIG. 3, stores the handle arm 16 in the storage position, and rotates the locking claw to lock the handle arm 16 to the storage position. The reverse operation to the above operation can be performed to rotate the seat back 12 and the seat cushion 13 to the use position easily.

As described above, the handle arm 16 is constituted such that the base end portion of the handle arm 16, which becomes the bottom of the handle arm 16 by bringing the seat back 12 to the use position, is rotatably coupled to the seat back 12 so that the handle arm 16 can be rotated between the storage position, where the handle arm 16 is positioned along the seat back rear surface 12B, and the use position, where the free end 21 of the handle arm 16 is positioned away from the seat back rear surface 12B. Accordingly, the operator can grab the handle arm 16 positioned in the use position and rotate the seat cushion and the seat back to the upper part of the vehicle interior easily, or rotate the seat cushion and the seat back downward easily. Moreover, since the handle arm 16 is provided on the seat back rear surface 12B side, even an enlarged handle arm 16 as shown in FIG. 4 does not cause obstruction to the seated person. By increasing the size of the handle arm 16, the operator can grab the handle arm 16 and rotate the seat back 12 and the seat cushion 13 at ease, as shown in FIG. 2 and FIG. 3.

Figure 6:
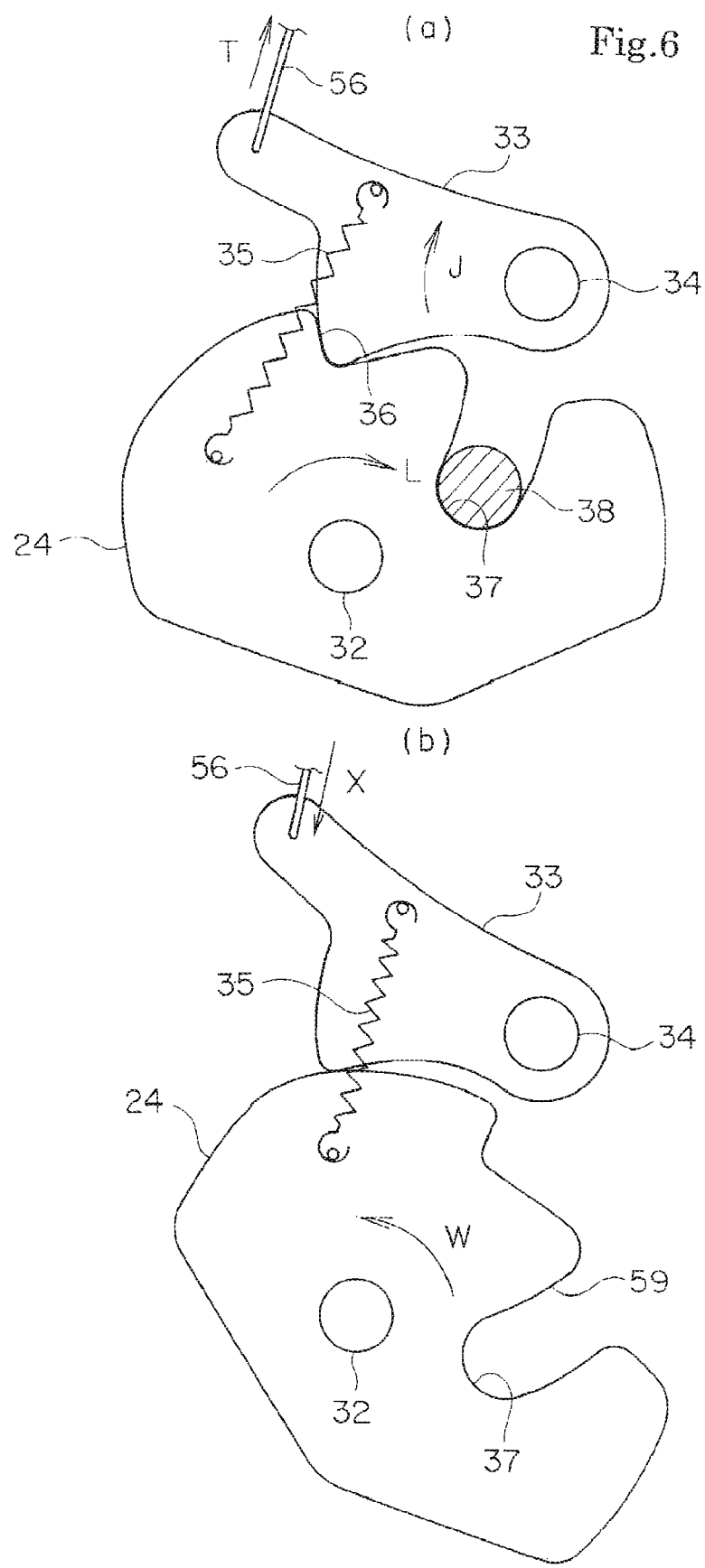
FIG. 6 is a drawing for explaining the actions of a second locking member and a second pawl.
Figure 7:
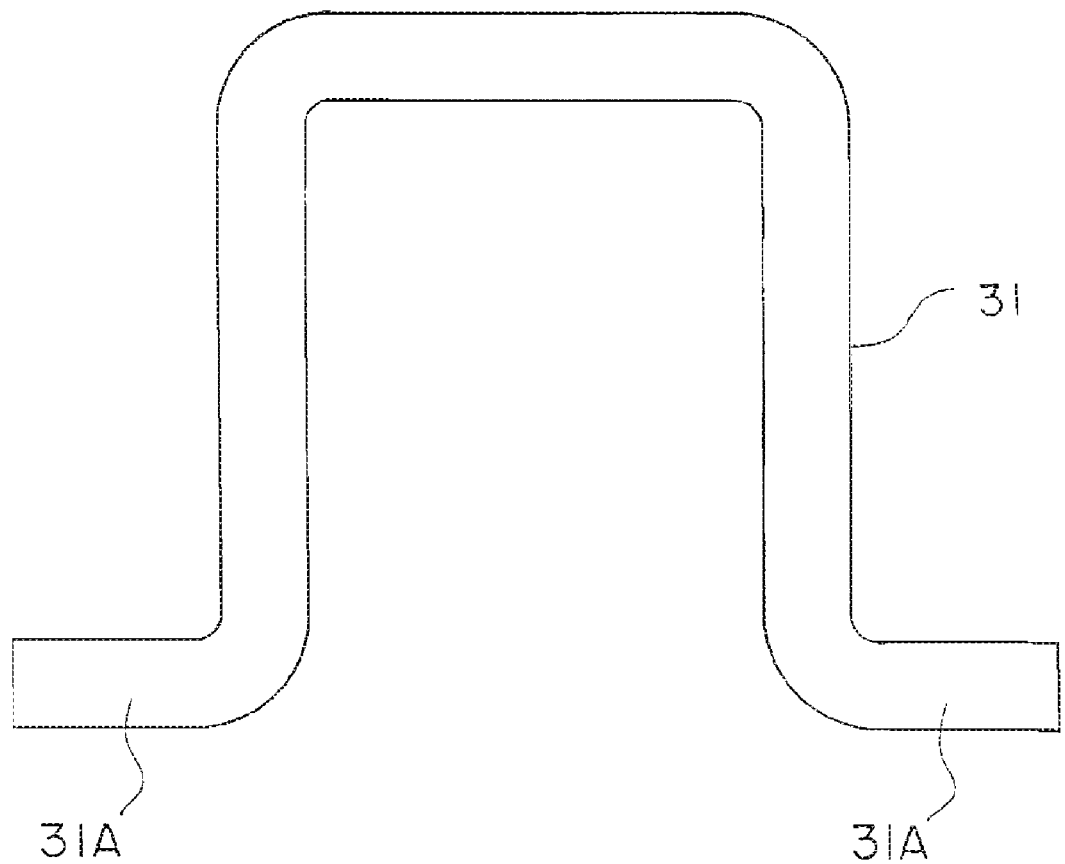
FIG. 7 is a front view of a striker.

As shown in FIG. 1 and FIG. 4, both of the side portions in the vehicle width direction of the seat cushion 13 and seat back 12 are provided with the abovementioned first and second locking members 23 and 24. FIG. 5 is an enlarged view showing the first locking member 23 and a constitution related thereto, and FIG. 6 is an enlarged view showing the second locking member 24 and a constitution related thereto.

As shown in FIG. 1, FIG. 4 and FIG. 5(a), the first locking member 23 is rotatably supported on the cushion frame (not shown) of the seat cushion 13 via a pin 25. A first pawl 26 adjacent to the first locking member 23 is rotatably supported on the cushion frame of the seat cushion 13 via a pin 27, and both end portions of first spring means 28 constituted in the form of a tension spring are hooked to the first locking member 23 and the first pawl 26 respectively.

When the seat cushion 13 is in the use position shown in FIG. 1, the first pawl 26 is engaged with an engaging portion 29 formed on the first locking member 23 and constituted in the form of a cutout, by the action of the first spring means 28 as shown in FIG. 5(a). Accordingly, the first locking member 23 is prohibited from rotating. At this time, the first striker 31 firmly fixed to the side panel 4 of the vehicle body 1 is engaged with an engaging concave portion 30 formed on the first locking member 23. Therefore, the seat cushion 13 is locked to the vehicle body 1. The position of the first locking member 23 at this time constitutes a locking position of the first locking member 23, and the position of the first pawl 26 at this time constitutes an engaging position of the first pawl 26. The first striker 31 is formed in substantially U-shape, with a base end portion 31A thereof fixed firmly to the side panel 4 of the vehicle body 1, and the engaging concave portion 30 of the first locking member 23 is engaged with the first striker 31.

On the other hand, as shown in FIG. 1, FIG. 4 and FIG. 6(a), the second locking member 24 also is rotatably supported on the seat back frame (not shown) of the seat back 12 via a pin 32. A second pawl 33 adjacent to the second locking member 24 is rotatably supported on the seat back frame of the seat back 12 via a pin 34, and both end portions of second spring means 35 constituted in the form of a tension spring are hooked to the second locking member 24 and the second pawl 33 respectively.

When the seat back 12 is in the use position shown in FIG. 1, the second pawl 33 is engaged with an engaging portion 36 formed on the second locking member 24 and constituted in the form of a cutout, by the action of the second spring means 35 as shown in FIG. 6(a). Accordingly, the second locking member 24 is prohibited from rotating. At this time, the second striker 38 firmly fixed to the side panel 4 of the vehicle body 1 is engaged with an engaging concave portion 37 formed on the second locking member 24. Therefore, the seat back 12 is locked to the vehicle body 1. The position of the second locking member 24 at this time constitutes a locking position thereof, and the position of the second pawl 33 at this time constitutes an engaging position of the second pawl 33. The second striker 38 has substantially the same configuration as the first striker 31, and a base end portion of the second striker 38 is firmly fixed to the side panel 4 of the vehicle body 1.

As described above, the automobile of present embodiment is provided with the first locking member 23, which is engaged with the first striker 31 fixed to the vehicle body 1 when the seat cushion 13 is in the use position, and thereby locks the seat cushion 13 to the vehicle body 1, and the second locking member 24, which is engaged with the second striker 38 fixed to the vehicle body 1 when the seat back 12 is in the use position, and thereby locks the seat back 12 to the vehicle body 1.

Here, as shown by the arrow I in FIG. 5(a), when the first pawl 26 rotates in the clockwise direction around the pin 27, the first pawl 26 is removed from the engaging portion 29 of the first locking member 23. Therefore, the first locking member 23 rotates in a direction indicated by the arrow K in FIG. 5(a) around the pin 25 by the pulling action of the first spring means 28, and thereby occupies the position shown in FIG. 5(b). Accordingly, the engaging concave portion 30 of the first locking member 23 is removed from the first striker 31, and the lock applied by the first locking member 23 to the seat cushion 13 is released. The position of the first locking member 23 at this time constitutes a lock releasing position of the first locking member 23, and the position of the first pawl 26 at this time constitutes an engagement releasing position of the first pawl 26.

Similarly, as shown by the arrow J in FIG. 6(a), when the second pawl 33 rotates in the clockwise direction around the pin 34, the second pawl 33 is removed from the engaging portion 36 of the second locking member 24. Therefore, the second locking member 24 is rotated in a direction indicated by the arrow L in FIG. 6(a) around the pin 32 by the pulling action of the second spring means 35, and thereby occupies the position shown in FIG. 6(b). Accordingly, the engaging concave portion 37 of the second locking member 24 is removed from the second striker 38, and the lock applied by the second locking member 24 to the seat back 12 is released. The position of the second locking member 24 at this time constitutes a lock releasing position of the second locking member 24, and the position of the second pawl 33 at this time constitutes an engagement releasing position of the second pawl 33.

As described above, the first locking member 23 is supported on the seat cushion 13 so as to be rotatable between the locking position where the engaging concave portion 30 is engaged with the first striker 31 to lock the seat cushion 13 to the vehicle body 1, and the lock releasing position where the engaging concave portion 30 is removed from the first striker 31 to release the lock of the seat cushion 13 to the vehicle body 1. The second locking member 24, on the other hand, is supported on the seat back 12 so as to be rotatable between the locking position where the engaging concave portion 37 is engaged with the second striker 38 to lock the seat back 12 to the vehicle body 1, and the lock releasing position where the engaging concave portion 37 is removed from the second striker 38 to release the lock of the seat back 12 to the vehicle body 1.

Here, the operator starts to rotate the handle arm 16 from its storage position to its use position, as described above, in a state in which the seat cushion 13 and the seat back 12 are locked to the use positions shown in FIG. 1, and when the handle arm 16 reaches the intermediate position shown with the two-dot chain line in FIG. 1, the first pawl 26 is rotated to its engagement releasing position and the first locking member 23 is rotated to the lock releasing position as shown in FIG. 5(b), whereby the lock of the seat cushion 13 is released. Next, when the handle arm 16 is rotated to the use position shown in FIG. 2, the second pawl 33 is rotated to its engagement releasing position and the second locking member 24 is rotated to the lock releasing position as shown in FIG. 6(b), whereby the lock of the seat back 12 is released. The seat 11 is provided with lock releasing means for releasing the locks applied by the first and second locking members 23 and 24 to the seat cushion 13 and the seat back 12 by interlocking with the rotation of the handle arm 16, as described above. The specific constitution of the lock releasing means is described in detail hereinafter. A constitution is possible in which when the handle arm 16 reaches a position between the intermediate position shown with the two-dot chain line in FIG. 1 and the use position shown in FIG. 2, the second locking member 24 is rotated to the lock releasing position to release the lock of the seat back.

By providing the lock releasing means described above, a time difference can be provided between the releasing of the lock applied by the first locking member 23 to the seat cushion 13 and the releasing of the lock applied by the second locking member 24 to the seat back 12, so that the lock to the seat cushion 13 is released first and the lock to the seat back 12 is released subsequently. Therefore, when the handle arm 16 is rotated toward the use position, first the action of the abovementioned spiral spring can be used to rotate the seat cushion 13 to the non-use position where it is superposed on the seat back 12 as shown in FIG. 2, and thereafter the action of the abovementioned gas damper stay can be used to rotate the seat back 12 in the direction indicated by the arrow E in FIG. 2 to bring the seat back 12 to the non-use position shown in FIG. 3. Specifically, the seat back 12 can be rotated to the non-use position in the upper part of the vehicle interior while folding up the seat cushion 13 and the seat back 12 properly.

As described above, the seat 11 of the automobile of present embodiment is provided with the lock releasing means for releasing the locks applied by the first and second locking members 23 and 24 to the seat cushion 13 and the seat back 12 by interlocking with the rotation of the handle arm 16 in such a way that, when the handle arm 16 is rotated from the storage position toward the use position in a state in which the seat back 12 is locked to its use position by the second locking member 24 and the seat cushion 13 is locked to its use position by the first locking member 23, the lock applied by the first locking member 23 to the seat cushion 13 is released first and thereafter the lock applied by the second locking member 24 to the seat back 12 is released in accordance with the rotation of the handle arm 16.

Next, the specific constitution of the abovementioned lock releasing means will be described clearly. The lock releasing means has the first and second pawls 26 and 33 and the first and second spring means 28 and 35 that are described above. Specifically, the lock releasing means has: the first pawl 26, which is supported on the seat cushion 13 so as to be rotatable between the engaging position where the first pawl 26 is engaged with the engaging portion 29 of the first locking member 23 to hold the first locking member 23 in its locking position, and the engagement releasing position where the first pawl 26 is removed from the engaging portion 29 of the first locking member 23 to allow the first locking member 23 to rotate to the lock releasing position; the second pawl 33, which is supported on the seat back 12 so as to be rotatable between the engaging position where the second pawl 33 is engaged with the engaging portion 36 of the second locking member 24 to hold the second locking member 24 in its locking position, and the engagement releasing position where the second pawl 33 is removed from the engaging portion 36 of the second locking member 24 to allow the second locking member 24 to rotate to the lock releasing position; the first spring means 28 for rotating and biasing the first locking member 23 toward its lock releasing position and rotating and biasing the first locking member 23 and the first pawl 26 in a direction for engaging the first locking member 23 and the first pawl 26 with each other; and the second spring means 35 for rotating and biasing the second locking member 24 toward its lock releasing position and rotating and biasing the second locking member 24 and the second pawl 33 in a direction for engaging the second locking member 24 and the second pawl 33 with each other.

Moreover, this lock releasing means has a time lag generating device 39 shown simply in FIG. 4, which is disposed on the inside of the seat back 12. FIG. 8 is an explanatory diagram simply showing the time lag generating device 39. As shown in FIG. 8, the time lag generation device 39 has a guide frame 40 that is fixed to the seat back frame of the seat back 12, and a slider 41 that is capable of sliding between a initial position shown in FIG. 8(a) and an actuated position shown in FIG. 8(b) in directions of the arrows M, N with the guidance of the guide frame 40. Both end portions of a first wire 42, which is one example of first coupling means, are fixedly connected to this slider 41 and the abovementioned handle arm 16 respectively, and the first wire 42 extends inside the seat back 12 as shown in FIG. 4.

As shown by the dashed line and the full line in FIG. 1 and FIG. 8(a) respectively, when the handle arm 16 is in the storage position the slider 41 occupies its initial position, and when the handle arm 16 is rotated to the use position shown in FIG. 2 and FIG. 8(b), the slider 41 is pulled by the first wire 42 and thereby moves to its actuated position. When the handle arm 16 is rotated back to the storage position, the slider 41 is pressed by the first wire 42 and thereby returns to the initial position shown in FIG. 8(a).

As described above, the lock releasing means of present embodiment: has the slider 41 that is supported on the seat back 12 via the guide frame 40 so as to be movable between the initial position and the actuated position; and the first coupling means for coupling the slider 41 to the handle arm 16 such that the slider 41 occupies its initial position when the handle arm 16 is in the storage position and that the slider 41 occupies its actuated position when the handle arm 16 is rotated to the use position. The first coupling means is constituted in the form of the first wire 42, both end portions of which are fixed to the handle arm 16 and the slider 41 respectively.

As shown in FIG. 8, on the other hand, a second wire 44, which is one example of second coupling means, is slidably inserted into a through-hole 43 formed in the slider 41. This second wire 44 extends inside the seat back 12 and the seat cushion 13, and protrudes to the outside the seat cushion 13 to extend along the side portion thereof, as shown in FIG. 4. One end portion of the second wire 44 is fixedly connected to the first pawl 26, as shown in FIG. 4 and FIG. 5. Moreover, the other end portion of the second wire 44 is slidably inserted into the through-hole 43 formed in the slider 41 shown in FIG. 8 as described above, and a small block 45 with a larger diameter than that of the through-hole 43 is fixed to this other end portion. In the example shown in FIG. 8(a), the small block 45 comes into contact with the slider 41 or is positioned adjacent to the slider 41 when the handle arm 16 is in the storage position and consequently the slider 41 occupies its initial position.

Here, as shown in FIG. 1, when the operator starts to rotate the handle arm 16 from the storage position as described above in a state in which the seat back 12 is locked to its use position by the second locking member 24 and the seat cushion 13 is locked to its use position by the first locking member 23, the slider 41 is pulled by the first wire 42 and starts sliding in the direction shown by the arrow M in FIG. 8(a). At this time, the slider 41 abuts on the small block 45 fixed to the other end portion of the second wire 44, and pulls the second wire 44 in a direction indicated by the arrow 0 in FIG. 8 (a) and FIG. 5(a). Accordingly, the first pawl 26 shown in FIG.

5(a) starts rotating in the direction of the arrow I. When the handle arm 16 is rotated to the intermediate position between the storage position and the use position as shown with the two-dot chain lines in FIG. 1 and FIG. 8(a) and the slider 41 reaches a position between its initial position and actuated position, the first pawl 26 is removed from the engaging portion 29 of the first locking member 23 and is then rotated to the engagement releasing position, as shown in FIG. 5(b). Consequently, the first locking member 23 is rotated to its lock releasing position, whereby the lock to the seat cushion 13 is released. Therefore, the seat cushion 13 is rotated from the use position shown in FIG. 1 to the non-use position shown in FIG. 2, by the action of the abovementioned spiral spring. At this time, the lock applied by the second locking member 24 to the seat back 12 is not yet released, hence the seat back 12 is locked and stopped at the use position shown in FIG. 2. The operation of releasing the lock to the seat back 12 will be described hereinafter.

As described above, the lock releasing means of present embodiment has the second coupling means for coupling the slider 41 to the first pawl 26 in such a way that, the handle arm 16 starts rotating from its storage position in a state in which the seat back 12 is locked to its use position by the second locking member 24 and the seat cushion 13 is locked to its use position by the first locking member 23, and when the handle arm 16 reaches the position between the storage position and use position and accordingly the slider 41 is moved to the position between the initial position and actuated position, the first pawl 26 is removed from the engaging portion 29 of the first locking member 23 to rotate to the engagement releasing position and thereby the first locking member 23 is allowed to rotate to the lock releasing position by the action of the first spring means 28. Moreover, the second coupling means is constituted in the form of the second wire 44, one end portion of which is fixed to the first pawl 26 while the other end portion passes through the slider 41 so as to be slidable relative to the slider 41 and fixed to the small block 45.

Moreover, the lock releasing means of present embodiment has a rotating arm device 46 having a plurality of rotating arms (not shown in FIG. 4) provided inside the seat back 12, as shown simply in FIG. 4. FIG. 9 and FIG. 10 are explanatory diagrams showing the rotating arm device 46 specifically. As shown in FIG. 9 and FIG. 10, the rotating arm device 46 has a first rotating arm 47 and a second rotating arm 48, each of which is rotatably supported on the seat back frame of the seat back 12 via a pin 50, 51. Both end portions of third spring means 49 constituted in the form of a tension spring are hooked to the first rotating arm 47 and the seat back frame respectively. Accordingly, the first rotating arm 47 is rotated and biased in the clockwise direction in FIG. 9 and FIG. 10, but is normally caused to abut on the stopper (not shown) and stops at its initial position shown in FIG. 9(a). Similarly, both end portions of fourth spring means 52 constituted in the form of a tension spring are hooked to the second rotating arm 48 and the seat back frame respectively. At this time, when the second rotating arm 48 is in its initial position shown in FIG. 9(a), the fourth spring means 52 is in a free state, and thus the second rotating arm 48 is not biased by the fourth spring means 52. In this manner, the second rotating arm 48 is held in its initial position.

Moreover, as shown in FIG. 9(a), one end portion of a third wire 53, which is an example of third coupling means, is fixedly connected to the first rotating arm 47. The third wire 53 extends inside the seat back 12 as shown in FIG. 4, and the other end portion of the third wire 53 is fitted slidably to a through-hole 54 formed in the slider 41, and a small block 55 with a larger diameter than that of the through-hole 54 is fixed to the other end portion, as shown FIG. 8(a). When the seat back 12 is locked to its use position by the second locking member 24, while the seat cushion 13 is locked to its use position by the first locking member 23, and when the handle arm 16 occupies the storage position as shown in FIG. 1, the small block 45 fixed to the other end portion of the second wire 44 is positioned closer to the slider 41 occupying the initial position, compared to the small block 55 fixed to the other end portion of the third wire 53 as shown in FIG. 8(a). A distance LM is provided between the small block 45 and the small block 55.

As shown in FIG. 6, one end portion of a fourth wire 56, which is an example of fourth coupling means, is fixedly connected to the second pawl 33. The other end portion of the fourth wire 56 is fitted slidably to a through-hole 57 formed in the second rotating arm 48, and a small block 58 with a larger diameter than that of the through-hole 57 is fixed to the other end portion, as shown in FIG. 9(a). When the second pawl 33 is in the engaging position shown in FIG. 6(a) and the second rotating arm 48 is in the initial position shown in FIG. 9(a), the small block 58 comes into contact with the second rotating arm 48 or is positioned adjacent to the second rotating arm 48.

As shown in FIG. 1, in a state in which the seat back 12 and the seat cushion 13 are in their respective use positions and the handle arm 16 occupies the storage position, the operator starts to rotate the handle arm 16 from its storage position toward the use position and when the slider 41 is moved from the initial position shown in FIG. 8(a) to the actuated position shown in FIG. 8(b), as described above, the slider 41 abuts on the small block 45 fixed to the other end portion of the second wire 44 and firstly pulls the second wire 44 in the direction indicated by the arrow 0 in FIG. 8(a), whereby the first pawl 26 is removed from the engaging portion 29 of the first locking member 23, and then the first locking member 23 is rotated to the lock releasing position shown in FIG. 5(b). In this manner, the lock applied by the first locking member 23 to the seat cushion 13 is released when the handle arm 16 is rotated to the intermediate position between the storage position and the use position as shown by the two-dot chain line in FIG. 1 and FIG. 8(a), and after the slider 41 starts pulling the second wire 44 the slider 41 abuts on the small block 55 fixed to the other end portion of the third wire 53, to pull the third wire 53 in a direction of the arrow P shown in FIG. 8(a) and FIG. 9(a). Consequently, the first rotating arm 47 occupying the initial position shown in FIG. 9(a) is pulled by the third wire 53 and starts rotating in a direction indicated by the arrow Q. Then, the first rotating arm 47 abuts on the second rotating arm 48 occupying the initial position, to rotate the second rotating arm 48 in a direction indicated by the arrow R in FIG. 9(b). In this manner, the first rotating arm 47 rotates the second rotating arm 48 and thereafter passes the second rotating arm 48 to release the pressing action on the second rotating arm 48, as shown in FIG. 9(c). When the handle arm 16 is rotated to the use position and accordingly the slider 41 reaches the actuated position shown in FIG. 8(b), the first rotating arm 47 reaches a terminal position shown in FIG. 9(c) and stops at this position. Once the pressing action of the first rotating arm 47 on the second rotating arm 48 is released, the second rotating arm 48 is rotated in a direction opposite to the direction indicated by the arrow R in FIG. 9(b) by the action of the fourth spring means 52, and is then rotated and caused to stop at the initial position as shown in FIG. 9(c).

As described above, when the second rotating arm 48 is pressed by the first rotating arm 47 and rotated from its initial position, the second rotating arm 48 applies pressure to the small block 58 fixed to the other end portion of the fourth wire 56, to pull the fourth wire 56 in a direction indicated by the arrow T in FIG. 6(a) and FIG. 9(b). Accordingly, the second pawl 33 shown in FIG. 6(a) rotates around the pin 34 in the direction indicated by the arrow J in FIG. 6(a), and thereby the second pawl 33 is removed from the engaging portion 36 of the second locking member 24. Consequently, the second locking member 24 is rotated to the lock releasing position shown in FIG. 6(b), whereby the lock to the seat back 12 is released, as described above. In this manner, the seat back 12 can be rotated to the non-use position shown in FIG. 3.

By moving the slider 41 from its initial position to its actuated position as described above, the third wire 53 is pulled, whereby the first rotating arm 47 and the second rotating arm 48 rotate from the respective initial positions and the second rotating arm 28 applies pressure to the small block 58 fixed to the other end of the fourth wire 56 that abuts on the second rotating arm 48, to pull the fourth wire 56. Accordingly, the second pawl 33 is removed from the engaging portion 36 of the second locking member 24 to release the lock to the seat back 12. At this time, the slider 41 moving from its initial position to its actuated position starts pulling the second wire 44 and the third wire 53 with a time difference so as to pull the second wire 44 first and the third wire 35 subsequently, hence the lock of the seat cushion 13 is released first and the lock of the seat back 12 is released subsequently. Therefore, as described above, the seat cushion 13 can be rotated to the non-use position shown in FIG. 2 with no difficulty, and subsequently the seat back 12 can be rotated to the non-use position shown in FIG. 3.

In addition, after the first rotating arm 47 passes the second rotating arm 48, the fourth spring means 52 causes the second rotating arm 48 to rotate to the initial position shown in FIG. 9(c). At this time, however, the second rotating arm 48 does not apply pressure to the fourth wire 56, and the second locking member 24 occupies the lock releasing position shown in FIG. 6(b), and the first pawl 26 is held in the engagement releasing position in a state in which the first pawl 26 is in contact with the second locking member 24. Therefore, even when the second rotating arm 48 rotates to its initial position, the fourth wire 56 is not activated, whereby the second rotating arm 48 returned to its initial position and the small block 58 fixed to the fourth wire 56 are largely apart from each other, as shown in FIG. 9(c).

As described above, the lock releasing means of present embodiment has: the first rotating arm 47 that is supported on the seat back 12 so as to be rotatable between the initial position and the terminal position; the third coupling means for coupling the slider 41 to the first rotating arm 47 in such a way that the first rotating arm 47 rotates from its initial position to the terminal position when the slider 41 moves from its initial position to its actuated position; the third spring means 49 for biasing the first rotating arm 47 in a direction in which the first rotating arm 47 rotates to its initial position; the second rotating arm 48 that is rotatably supported on the seat back 12; the fourth spring means 52 for biasing the second rotating arm 48 in a direction in which the second rotating arm 48 rotates to its initial position; and the fourth coupling means for coupling the second rotating arm 48 to the second pawl 33 such that, the handle arm 16 starts rotating from its storage position in a state in which the seat back 12 is locked to its use position by the second locking member 24, and when the first rotating arm 47 that starts rotating from its initial position to the terminal position presses the second rotating arm 48 occupying its initial position and thereby rotates the second rotating arm 48, the second pawl 33 is removed from the engaging portion 36 of the second locking member 24 to rotate to the engagement releasing position, and thereby the second locking member 24 is allowed to rotate to the lock releasing position by the action of the second spring means 35, but even when the second rotating arm 48 is rotated to its initial position by the action of the fourth spring means 52 in a state in which the second locking member 24 occupies the lock releasing position, the second pawl 33 stays in the engagement releasing position.

Moreover, in the lock releasing means, the positions of the first and second rotating arms 47 and 48 are set in such a way that, when the first rotating arm 47 rotates from its initial position to the terminal position, the first rotating arm 47 presses the second rotating arm 48 to rotate the second rotating arm 48, and then passes the second rotating arm 48 to release the pressing action on the second rotating arm 48 so that the second rotating arm 48 is rotated to its initial position by the action of the fourth spring means 52.

In addition, in the lock releasing means, the second coupling means, the third coupling means and the slider 41 are constituted so as to regulate the timing at which the first pawl 26 starts rotating and the timing at which the first rotating arm 47 starts rotating, in such a way that, in a state in which the seat back 12 is locked to its use position by the second locking member 24 and the seat cushion 13 is locked to its use position by the first locking member 23, the handle arm 16 starts rotating from its storage position to its use position and when the slider 41 moves from its initial position to its actuated position, the first pawl 26 is removed from the engaging portion 29 of the first locking member 23 first, and subsequently the second pawl 33 is removed from the engaging portion 36 of the second locking member 24.

Furthermore, the third coupling means is constituted in the form of the third wire 53, one end portion of which is fixed to the first rotating arm 47 while the other end portion passes through the slider 41 so as to be relatively slidable with respect to the slider 41 and is fixed to the small block 55. The fourth coupling means is constituted in the form of the fourth wire 56, one end portion of which is fixed to the second pawl 33 while the other end portion passes through the second rotating arm 48 so as to be relatively slidable with respect to the second rotating arm 48 and is fixed to the small block 58.

Incidentally, after the seat back 12 and the seat cushion 13 are rotated to the non-use position shown in FIG. 3, the operator rotates the handle arm 16 in the direction indicated by the arrow H in FIG. 3 to store the handle arm 16 in the storage position. When the handle arm 16 is rotated to the storage position, the slider 41 is pressed by the first wire 42 and returned from its actuated position shown in FIG. 8(b) to its initial position shown in FIG. 8(c). Therefore, the restraining action of the slider 41 onto the third wire 53 is released, hence the first rotating arm 47 is rotated in a direction indicated by the arrow U in FIG. 9(c) by the action of the third spring means 49 and returned to the initial position shown in FIG. 10(a), and the third wire 53 is returned to its initial position shown in FIG. 8(c). At this time as well, the first rotating arm 47 presses the second rotating arm 48 stopping at the initial position shown in FIG. 9(c), to rotate the second rotating arm 48 in a direction indicated by the arrow V in FIG. 9(c), and then passes the second rotating arm 48 to rotate to the initial position shown in FIG. 10(a). Moreover, once the first rotating arm 47 passes the second rotating arm 48 and thereby the pressing action of the first rotating arm 47 on the second rotating arm 48 is released, the second rotating arm 48 is rotated in a direction opposite to the direction indicated by the arrow V in FIG. 9(c) by the action of the fourth spring means 52, and is then returned to its initial position shown in FIG. 10(a). When the second rotating arm 48 rotates in this manner, the second rotating arm 48 does not abut on the small block 58 fixed to the fourth wire 56, and the second locking member 24 occupies the lock releasing position shown in FIG. 6(*b*), while the second pawl 33 is held in the engagement releasing position in a state in which the second pawls 33 is in contact with the second locking member 24. Therefore, even when the second rotating arm 48 rotates in the manner described above, the second rotating arm 48 simply slides with respect to the fourth wire 56, hence the fourth wire 56 is not activated.

As described above, the positions of the first and second rotating arms are set in such a way that, when the first rotating arm 47 rotates from its terminal position to its initial position, the first rotating arm 47 presses and rotates the second rotating arm 48 and thereafter passes the second rotating arm 48 to return to the initial position of the first rotating arm 47.

On the other hand, when the slider 41 returns from its activated position shown in FIG. 8(*b*) to its initial position shown in FIG. 8(*c*) as the handle arm 16 occupying the use position shown in FIG. 3 is rotated in the direction indicated by the arrow H in FIG. 3 and stored in the storage position, the first locking member 23 occupies the lock releasing position shown in FIG. 5(*b*), while the first pawl 26 comes into contact with the first locking member 23 and is held in the engagement releasing position. Therefore, when the slider 41 returns to its initial position, the slider 41 simply slides with respect to the second wire 44, hence the second wire 44 is not activated. In this manner, the second coupling means constituted in the form of the second wire 44 couples the slider 41 and the first pawl 26 to each other in such a way that the first pawl 26 stays in its engagement releasing position even when the handle arm 16 is rotated from its use position to the storage position and accordingly the slider 41 returns to its initial position in a state in which the first locking member 23 occupies the lock releasing position.

Incidentally, in order to lift the seat back 12 and the seat cushion 13 down from the position in the upper part of the vehicle interior shown in FIG. 3, first the abovementioned locking claw, not shown, is rotated to release the lock to the handle arm 16 stored in the storage position, and thereafter the handle arm 16 is rotated in the opposite direction to the arrow H to bring the handle arm 16 to the use position. Accordingly, the slider 41 is moved again to its actuated position shown in FIG. 8(*d*). Consequently, the third wire 53 positioned as shown in FIG. 8(*c*) is pulled in the direction indicated by the arrow P in FIG. 8(*d*) again and moved to the position shown in FIG. 8(*d*). Therefore, the first rotating arm 47 placed in the initial position shown in FIG. 10(*a*) is rotated in the direction indicated by the arrow Q again to rotate the second rotating arm 48 in the direction indicated by the arrow R in FIG. 10(*a*), and thereafter passes the second rotating arm 48 to reach and stop the terminal position shown in FIG. 10(*b*). In this case as well, once the first rotating arm 47 passes the second rotating arm 48, the action of the fourth spring means 52 causes the second rotating arm 48 to return to its initial position shown in FIG. 10(*b*). At this time as well, the second rotating arm 48 does not apply pressure to the small block 58 fixed to the fourth wire 56, and the second wire 44 is not moved by the slider 41, hence the first and second locking members 23 and 24 remain to occupy the lock releasing positions shown in FIG. 5(*b*) and FIG. 6(*b*).

On the other hand, when the handle arm 16 is rotated from its storage position to the use position shown in FIG. 3, the third locking member 61 provided on the seat back 13 (FIG. 1) is removed from the third striker 62 fixed to the vehicle body as described hereinafter, whereby the lock to the seat back 12 is released.

Here, the operator grabs the handle arm 16 occupying the use position, and rotates the seat cushion 13 and the seat back 12 in the direction indicated by the arrow F in FIG. 3 to bring the seat back 12 to the use position shown in FIG. 2. At this time, when the seat back 12 reaches a position immediately before its use position, a contact portion 59 of the second locking member 24 shown in FIG. 6(*b*) abuts on the second striker 38 shown in FIG. 6(*a*), whereby the second locking member 24 occupying the lock releasing position acts against the action of the second spring means 35 to rotate in a direction indicated by the arrow W in FIG. 6(*b*). Therefore, once the seat back 12 reaches the use position, the second locking member 24 rotates to the locking position shown in FIG. 6(*a*), the engaging concave portion 37 thereof comes into engagement with the second striker 38, and the second pawl 33 is rotated in a direction opposite to the direction indicated by the arrow J in FIG. 6(*a*) by the pulling action of the second spring means 35, whereby the second pawl 33 comes into engagement with the engaging portion 36 of the second locking member 24. Specifically, the second pawl 33 is rotated to its engaging position. In this manner, the seat back 12 is locked to its use position.

As described above, when the second locking member 24 rotates from its lock releasing position to the locking position and the second pawl 33 rotates to its engaging position, the fourth wire 56 is pulled by the second pawl 33 in a direction indicated by the arrow X in FIG. 6(*b*) and FIG. 10(*b*). When the second pawl 33 occupies the engagement releasing position, the small block 58 fixed to the fourth wire 56 is separated from the second rotating arm 48 occupying the initial position as shown in FIG. 10(*b*). Therefore, even when the fourth wire 56 is pulled in the direction indicated by the arrow X in FIG. 10(*b*), the fourth wire 56 simply slides with respect to the second rotating arm 48, and thus the second rotating arm 48 is not rotated. The small block 58 fixed to the fourth wire 56 is brought into contact with or positioned in the vicinity of the second rotating arm 48 as shown in FIG. 10(*c*), by rotating the second locking member 24 to the locking position and pulling the fourth wire 56 in the direction indicated by the arrow X in FIG. 10(*b*). In this manner, the seat back 12 can be automatically locked to the vehicle body 1 simply by rotating the seat back 12 from its non-use position to its use position while keeping the handle arm 16 in its use position.

As described above, when the seat back 12 rotates from its non-use position to its use position, the second locking member 24 collides with the second striker 38 and rotates, whereby the engaging concave portion 37 comes into engagement with the second striker 38. Also, the second pawl 33 is brought into engagement with the engaging portion 36 of the second locking member 24 by the action of the second spring means 35, whereby the seat back 12 is locked to the vehicle body 1.

Next, the operator presses the handle arm 16 placed in the use position shown in FIG. 2, toward the front of the vehicle body, rotates the handle arm 16 in a direction opposite to the direction indicated by the arrow G in FIG. 2, and stores the handle arm 16 in the storage position. In accordance with this operation, the slider 41 is pressed by the first wire 42 and moved from the actuated position shown in FIG. 8(*d*) to the initial position shown in FIG. 8(*c*). At this time, because the slider 41 slides with respect to the second wire 44, the second wire 44 is not actuated and thus stays in the position shown in FIG. 8(*c*).

On the other hand, when the slider 41 returns to the initial position shown in FIG. 8(*c*), the first rotating arm 47 shown in FIG. 10(*c*) is biased by the action of the third spring means 49, thereby rotated in the direction indicated by the arrow U in FIG. 10(*c*), and then passes the second rotating arm 48 to return to the initial position. Accordingly, the third wire 53 is moved to the initial position shown in FIG. 8(c). At this time as well, the second rotating arm 48 is pressed by the first rotating arm 47 and rotated in the direction indicated by the arrow V in FIG. 10(c). Thereafter the second rotating arm 48 is returned to its initial position by the action of the fourth spring means 52. At this time, the second rotating arm 48 does not apply pressure to the small block 58 fixed to the fourth wire 56, and thus the fourth wire 56 is not actuated.

As described above, when storing the handle arm 16 from the use position into the storage position, the operator presses the handle arm 16 toward the front of the vehicle body. At this time the seat back 12 is already locked to the vehicle body 1, and thus the seat back 12 is not rotated in the direction indicated by the arrow E in FIG. 2 by the pressing force applied to the handle arm 16. Therefore, the handle arm 16 can be easily rotated to its storage position.

Next, the seat cushion 13 shown in FIG. 2 is rotated in the direction indicated by the arrow D in FIG. 2 to bring the seat cushion 13 to the use position shown in FIG. 1. When the seat cushion 13 reaches the position immediately before its use position, a contact portion 60 of the first locking member 23 shown in FIG. 5(b) abuts on the first striker 31 shown in FIG. 5(a), whereby the first locking member 23 occupying the lock releasing position acts against the action of the first spring means 28 to rotate in the direction indicated by the arrow Y in FIG. 5(b). Therefore, when the seat cushion 13 reaches the use position, the first locking member 23 is rotated to the locking position shown in FIG. 5(a), whereby the engaging concave portion 30 of the first locking member 23 comes into engagement with the first striker 31. Also, the first pawl 26 is rotated in the direction opposite to the direction indicated by the arrow I in FIG. 5(a) by the pulling action of the first spring means 28, whereby the first pawl 26 comes into engagement with the engaging portion 29 of the first locking member 23. Specifically, the first pawl 26 is rotated to its engaging position. In this manner, the seat cushion 13 is locked to its use position.

As described above, when the first pawl 26 is rotated to the engaging position, the second wire 44 is pulled in a direction indicated by the arrow Z in FIG. 5(b). Therefore, when the first locking member 23 returns to the locking position and the first pawl 26 is rotated to the engaging position, the second wire 44 is moved to the initial position shown in FIG. 8(a). In this manner, all members are returned to the positions shown in FIG. 1, FIG. 5(a), FIG. 6(a) and FIG. 8(a).

As described above, when the seat cushion 13 is rotated from its non-use position to its use position, the first locking member 23 collides with the first striker 31 and thereby rotates, whereby the engaging concave portion 30 of the first locking member 23 comes into engagement with the first striker 31, and the first pawl 26 is brought into engagement with the engaging portion 29 of the first locking member 23 by the action of the first spring means 28, whereby the seat cushion 13 is locked to the vehicle body 1.

The above has described the first and second locking members 23 and 24 provided on one of the end portions of the seat in the vehicle width direction, and the constitution associated with these members. However, the automobile of present embodiment has the first and second locking members on the other end portion of the seat in the vehicle width direction as well, and the components associated with these first and second locking members. These components are not different from the abovementioned first and second locking members 23 and 24 and the constitution associated therewith, hence the explanation thereof is omitted.

Moreover, the first and second locking members 23 and 24, first and second pawls 26 and 33 and wires that are disposed on each side portion of the seat cushion 13 and seat back 12 are covered with a cover, not shown, so that these members cannot be touched directly.

The third locking member 61, which was simply described previously, and the constitution associated therewith will be described next.

Figure 11:
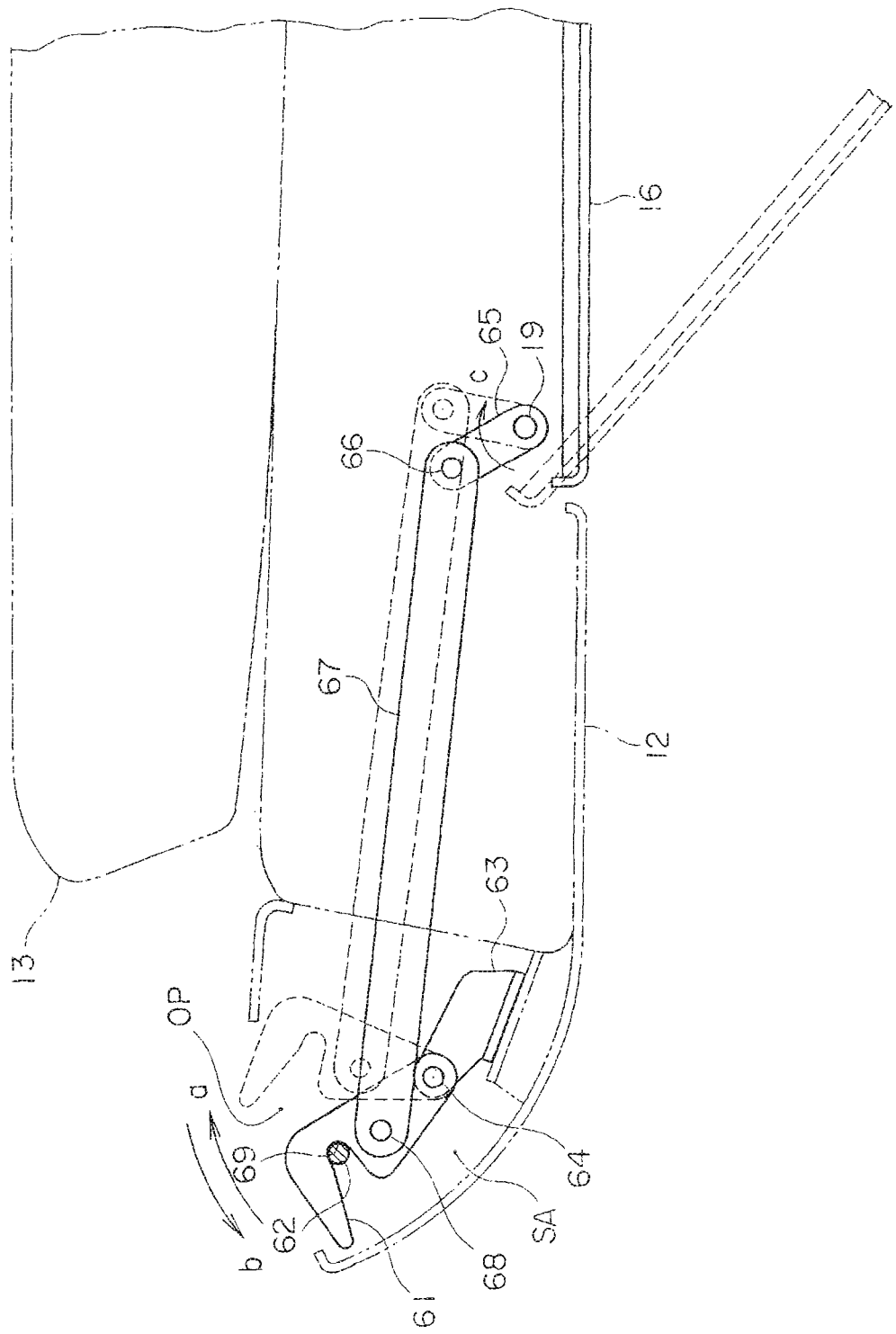
FIG. 11 is a drawing for explaining the actions of a third locking member.

As shown in FIG. 1, the third locking member 61 is provided inside the seat back 12. In FIG. 11, the seat back 12 and seat cushion 13, that are lifted up to the non-use position, are shown by two-dot line to clearly show the third locking member 61 and the constitution associated therewith. The third locking member 61 is disposed in a space SA formed in a base portion side of the seat back 12, and is supported on a base 63 fixed to the seat back 12 via a pin 64 so as to be rotatable in directions indicated by the arrows a, b in FIG. 11.

On the other hand, the handle arm 16 is fixed to the abovementioned pin 19. This pin 19 is rotatably supported on the seat back frame of the seat back 12. In FIG. 11, the handle arm 16 and the pin 19 are separated from each other for the convenience of explanation. A base end portion of a first link 65 is fixed to this pin 19, and a leading end portion of the first link 65 is coupled to one end of a second link 67 via a coupling pin 66 so as to be relatively rotatable. The other end of the second link 67 is coupled to the third locking member 61 via another coupling pin 68 so as to be relatively rotatable.

When the handle arm 16 is stored in the storage position as shown by the full lines in FIG. 11, the first and second links 65 and 67 and the third locking member 61 occupy the position shown by the full lines shown in FIG. 11. At this time, an engaging concave portion 69 formed in the third locking member 61 is engaged with the third striker 62 fixed to the inner panel 2A (FIG. 1) of the roof panel constituting the vehicle body, and thereby the seat back 12 and the seat cushion 13 are locked to the non-use position thereof. Specifically, a part of the third striker 62 enters the space SA of the seat back 12 through an opening OP of the space SA, and the third locking member 61 is engaged with the part of the third striker. The position of the third locking member 61 at this time constitutes a locking position of the third locking member 61. The shape of the third striker 62 is substantially identical with the shapes of the first and second strikers 31 and 38, and a base end portion of the third striker 62 is firmly fixed to the inner panel of the roof panel.

When the handle arm 16 is rotated to the use position as shown by the dashed lines in FIG. 11, the pin 19 is rotated as the handle arm 16 moves, and thus the first link 65 fixed to the pin 19 is rotated in a direction indicated by the arrow c in FIG. 11 to occupy the position shown with a dashed line. In accordance with this, the second link 67 also moves to the position shown by a dashed line, and the third locking member 61 rotates in the direction indicated by the arrow a. Accordingly, the engaging concave portion 69 of the third locking member 61 is removed from the third striker 62 as shown by a dashed line in FIG. 11, and thereby the lock to the seat back 12 is released. The position of the third locking member 61 at this time constitutes a lock releasing position of the third locking member 61. By releasing the lock to the seat back 12 in this manner, the operator can grab the handle arm 16 occupying the use position and rotate the seat back 12 and the seat cushion 13 to the position shown in FIG. 2, as described above.

When, again, the seat back 12 and the seat cushion 13 are brought to the non-use position shown in FIG. 3 and FIG. 11, and the handle arm 16 is stored in the storage position as shown by the full line in FIG. 11, the first and second links 65 and 67 move to the positions shown by the full lines. Accordingly the third locking member 61 is rotated in the direction indicated by the arrow b in FIG. 11 to reach the locking position, and the engaging concave portion 69 of the third locking member 61 comes into engagement with the third striker 62, whereby the seat back 12 is locked to the non-use position.

The first and second links 65 and 67 and coupling pins 66 and 68 constitute an example of interlocking means for rotating the third locking member 61 by interlocking with the rotation of the handle arm 16.

As described above, the automobile of present embodiment has the third locking member 61 that is engaged with the third striker 62 fixed to the vehicle body 1 when the seat back 12 is in its non-use position, in order to lock the seat back 12 to the vehicle body 1. The third locking member 61 is supported on the seat back 12 so as to be rotatable between the locking position where the engaging concave portion 69 of the third locking member 61 is engaged with the third striker 62 to lock the seat back 12 to its non-use position, and the lock releasing position where the engaging concave portion 69 is removed from the third striker 62 to release the lock of the seat back 12 to the vehicle body 1. The interlocking means provided in the seat back 12 rotates the third locking member 61 by interlocking with the rotation of the handle arm 16, such that the third locking member 61 occupies its lock releasing position when the handle arm 16 is in its use position, and that the third locking member 61 occupies its locking position when the handle arm 16 is rotated to its storage position.

Incidentally, as described above, biasing force of the gas damper stay, not shown, is used when rotating the seat back 12 and the seat cushion 13, which are folded up as shown in FIG. 2, to the non-use position as shown in FIG. 3. In such a case, when the temperature is low, the pressure in the cylinder of the gas damper stay decreases, and thus the seat back 12 and the seat cushion 13 might not be able to rotate to the non-use position shown in FIG. 3 and might stop at the position immediately before this non-use position. A similar situation occurs even when the seat back 12 and the seat cushion 13 are lifted up to the non-use position by the force of the operator only, or when the seat back 12 is lifted up to the non-use position by means of the force of a spring other than the gas damper stay. In this case, it is not easy to lift up the seat back 12 and the seat cushion 13 from the position immediately before the non-use position to the non-use position by means only of the power of the operator.

Therefore, the automobile of present embodiment is constituted in such a way that the seat back 12 and the seat cushion 13 are rotated to the non-use position thereof by simply rotating the handle arm 16 to the storage position, in the case in which the seat back 12 and the seat cushion 13 are stopped when the operator grabs the handle arm 16 positioned in the use position to lift up the seat back 12 and the seat cushion 13 to the position immediately before the non-use position. The specific constitution of this automobile is as follows.

FIG. 12(a) shows a situation where the seat back 12 is stopped upon reaching the position immediately before its non-use position when the handle arm occupying the use position is grabbed to lift up the seat back 12 to the non-use position. In this time, the handle arm 16 (not shown in FIG. 12) occupies the use position shown in FIG. 3. When the operator rotates the handle arm 16 in the direction indicated by the arrow H in FIG. 3 in this state, the third locking member 62 is slightly rotated in the direction indicated by the arrow b in FIG. 12(b), and a guide face 70 in the vicinity of the engaging concave portion 69 comes into contact with the third striker 62 as shown in FIG. 12(b). When the handle arm is further rotated toward the storage position in this state, the third locking member 61 is further rotated in the direction indicated by the arrow b in FIG. 12(b). At this time, because the guide face 70 contacts with the third striker 62 and slides on the third striker, the seat back 12 and the seat cushion 13 are rotated toward the non-use position thereof, and the engaging concave portion 69 of the third locking member 61 comes into engagement with the third striker 62, as shown by the full lines in FIG. 11. At this time, the seat back 12 and the seat cushion 13 are brought to the non-use position thereof. In this manner, the seat back 12 that is stopped at the position immediately before the non-use position can be lifted up to its non-use position simply by rotating the handle arm 16 from its use position to the storage position, and thus the seat back 12 can be rotated to the non-use position easily.

As described above, in the automobile of present embodiment, the guide face 70, which is formed in the third locking member 61, brings the engaging concave portion 69 of the third locking member 61 into engagement with the third striker 62 while being in sliding contact with the third striker 62, when the handle arm 16 is rotated from its use position to the storage position to rotate the third locking member 61 from the lock releasing position toward the locking position in the case in which the seat back 12 is rotated from its use position to the non-use position but stopped at the position immediately before the non-use position in a state in which the handle arm 16 is brought to the use position thereof.

Although FIG. 11 shows one third locking member 61, the seat back 12 occupying the non-use position thereof can be locked more stably by constitution in which a plurality of third locking members are provided at intervals in the vehicle width direction and each of the locking members is actuated by interlocking with the rotation of the handle arm 16 in the manner described above.

What is claimed is:

1. An automobile comprising a seat that is disposed within a vehicle interior and has a seat back supporting the back of a seated person and a seat cushion supporting the hip of the seated person, comprising:
   the seat cushion is coupled to the seat back so as to be rotatable between a use position where the seated person is seated and a non-use position where the seat cushion is superposed on the seat back, while the seat back is supported on a vehicle body so as to be rotatable between a use position where the seat back can support the back of the seated person and a non-use position where the seat back and the seat cushion are lifted up to an upper part of the vehicle interior in a state in which the seat cushion is superposed on the seat back,
   the seat cushion is positioned on the seat back in a superposed manner when the seat back is in the non-use position,
   a handle arm is provided on a seat back rear surface that is the opposite side of a seat back supporting surface supporting the back of the seated person,
   a base end portion of the handle arm, which becomes the bottom of the handle arm when the seat back is in the use position, is rotatably coupled to the seat back in such a way that the handle arm rotates between a storage position where the handle arm is positioned along the seat back rear surface and a use position where a free end of the handle arm is separated from the seat back rear surface,
   a first locking member that is engaged with a first striker fixed to the vehicle body and thereby locks the seat cushion to the vehicle body when the seat cushion is in the use position;

a second locking member that is engaged with a second striker fixed to the vehicle body and thereby locks the seat back to the vehicle body when the seat back is in the use position; the first locking member is supported on the seat cushion so as to be rotatable between a locking position where an engaging concave portion of the first locking member is engaged with the first striker to lock the seat cushion to the vehicle body and a lock releasing position where the engaging concave portion of the first locking member is removed from the first striker to release the lock of the seat cushion to the vehicle body, the second locking member is supported on the seat back so as to be rotatable between a locking position where an engaging concave portion of the second locking member is engaged with the second striker to lock the seat back to the vehicle body and a lock releasing position where the engaging concave portion of the second locking member is removed from the second striker to release the lock of the seat back to the vehicle body, the lock releasing means comprises:

a first pawl, which is supported on the seat cushion so as to be rotatable between an engaging position where the first pawl is engaged with an engaging portion of the first locking member to hold the first locking member at the locking position thereof and an engagement releasing position where the first pawl is removed from the engaging portion of the first locking member to allow the first locking member to rotate to the lock releasing position;

a second pawl, which is supported on the seat back so as to be rotatable between an engaging position where the second pawl is engaged with an engaging portion of the second locking member to hold the second locking member at the locking position thereof and an engagement releasing position where the second pawl is removed from the engaging portion of the second locking member to allow the second locking member to rotate to the lock releasing position;

first spring means for biasing the first locking member toward the lock releasing position thereof, and biasing the first locking member and the first pawl in a direction in which the first locking member and the first pawl are engaged with each other;

second spring means for biasing the second locking member toward the lock releasing position thereof, and biasing the second locking member and the second pawl in a direction in which the second locking member and the second pawl are engaged with each other;

a slider, which is supported on the seat back so as to be movable between a initial position and an actuated position;

first coupling means for coupling the slider to the handle arm in such a way that the slider occupies the initial position thereof when the handle arm is in the storage position and that the slider occupies the actuated position thereof when the handle arm is rotated to the use position thereof;

second coupling means for coupling the slider to the first pawl in such a way that, in a state in which the seat back is locked to the use position thereof by the second locking member and in which the seat cushion is locked to the use position thereof by the first locking member, the handle arm starts rotating from the storage position thereof and when the handle arm reaches a position between the storage position and the use position and accordingly the slider moves to a position between the initial position and the actuated position thereof, the first pawl is removed from the engaging portion of the first locking member to rotate to the engagement releasing position and thereby the first locking member is allowed to rotate to the lock releasing position by the action of the first spring means, but the first pawl is caused to remain in the engagement releasing position thereof even when the handle arm rotates from the use position to the storage position thereof and accordingly the slider returns to the initial position thereof in a state in which the first locking member occupies the lock releasing position;

a first rotating arm, which is supported on the seat back so as to be rotatable between an initial position and a terminal position;

third coupling means for coupling the slider to the first rotating arm in such a way that the first rotating arm rotates from the initial position to the terminal position thereof when the slider moves from the initial position to the actuated position thereof;

third spring means for biasing the first rotating arm in a direction in which the first rotating arm rotates to the initial position thereof;

a second rotating arm supported rotatable on the seat back;

fourth spring means for biasing the second rotating arm in a direction in which the second rotating arm rotates to an initial position thereof; and fourth coupling means for coupling the second rotating arm to the second pawl in such a way that, the handle arm starts rotating from the storage position thereof in a state in which the seat back is locked to the use position thereof by the second locking member, and when the first rotating arm, which starts rotating from the initial position to the terminal position, presses the second rotating arm occupying the initial position thereof to rotate the second rotating arm, the second pawl is removed from the engaging portion of the second locking member to rotate to the engagement releasing position and thereby the second locking member is allowed to rotate to the lock releasing position by the action of the second spring means, but the second pawl is caused to remain in the engagement releasing position thereof even when the second rotating arm is rotated to the initial position thereof by the action of the fourth spring means in a state in which the second locking member occupies the lock releasing position, and wherein the positions of the first and second rotating arms are set in such a way that, when the first rotating arm rotates from the initial position to the terminal position thereof, the first rotating arm presses and thereby rotates the second rotating arm, and thereafter the first rotating arm passes the second rotating arm to release pressing on the second rotating arm, and accordingly the second rotating arm is rotated to the initial position thereof by the action of the fourth spring means, and in such a way that, when the first rotating arm rotates from the terminal position to the initial position thereof, the first rotating arm presses and thereby rotates the second rotating arm, and thereafter the first rotating arm passes the second rotating arm to return to the initial position of the first rotating arm, the second coupling means, the third coupling means, and the slider regulate a timing at which the first pawl starts rotating and a timing at which the first rotating arm starts rotating, in such a way that the first pawl is removed from the engaging portion of the first locking member first and thereafter the second pawl is removed from the engaging portion of the second locking member, when the handle arm starts rotating from the storage position toward the use position thereof in a state in which the seat back is locked to the use position thereof by the second locking member and in which the seat cushion is locked to the use position thereof by the first locking member, and the slider moves from the initial position to the actuated position thereof, when the seat back rotates from the non-use position to the use position thereof, the second locking member collides with the second striker and thereby rotates, whereby the engaging concave portion of the second locking member is brought into engagement with the second striker and the second pawl is brought into engagement with the engaging portion of the second locking member by the action of the second spring means, so that the seat back is locked to the vehicle body, and when the seat cushion rotates from the non-use position to the use position thereof, the first locking member collides with the first striker and thereby rotates, whereby the engaging concave portion of the first locking member is brought into engagement with the first striker and the first pawl is brought into engagement with the engaging portion of the first locking member by the action of the first spring means, so that the seat cushion is locked to the vehicle body lock releasing means for releasing locks applied by the first and second locking members to the seat cushion and the seat back by interlocking with rotation of the handle arm, so as to release the lock applied by the first locking member to the seat cushion first and thereafter release the lock applied by the second locking member to the seat back in accordance with the rotation of the handle arm when the handle arm is rotated from the storage position toward the use position.

2. The automobile according to claim 1, wherein the first coupling means comprises a first wire, both end portions of which are fixed to the handle arm and the slider respectively, the second coupling means comprises a second wire, one end portion of which is fixed to the first pawl while the other end portion passes through the slider so as to be relatively slidable with respect to the slider and has a small block fixed thereto, the third coupling means comprises a third wire, one end portion of which is fixed to the first rotating arm while the other end portion passes through the slider so as to be relatively slidable with respect to the slider and has a small block fixed thereto, and the fourth coupling means comprises a fourth wire, one end portion of which is fixed to the second pawl while the other end portion passes through the second rotating arm so as to be relatively slidable with respect to the second rotating arm and has a small block fixed thereto, and wherein, in a state in which the seat back is locked to the use position thereof by the second locking member, while the seat cushion is locked to the use position thereof by the first locking member, and in which the handle arm occupies the storage position thereof, the small block fixed to the other end portion of the second wire is positioned closer to the slider occupying the initial position, compared to the small block fixed to the other end portion of the third wire, and when the handle arm is rotated from the storage position to the use position thereof and accordingly the slider moves from the initial position to the actuated position thereof, the slider abuts on the small block fixed to the other end of the second wire and firstly pulls the second wire to remove the first pawl from the engaging portion of the first locking member, and after starting pulling the second wire, the slider abuts on the small block fixed to the other end portion of the third wire and pulls the third wire to rotate the first rotating arm and the second rotating arm from the respective initial positions thereof, and the second rotating arm applies pressure to the small block fixed to the fourth wire abutting on the second rotating arm to pull the fourth wire, and accordingly the second pawl is removed from the engaging portion of the second block member.

3. The automobile according to claim 1 comprising a third locking member, which is engaged with a third striker fixed to the vehicle body and thereby locks the seat back to the vehicle body when the seat back is in the non-use position thereof, and is supported on the seat back so as to be rotatable between a locking position, where an engaging concave portion of the third locking member is engaged with the third striker to lock the seat back to the non-use position thereof, and a lock releasing position, where the engaging concave portion is removed from the third striker to release the lock of the seat back to the vehicle body, wherein the seat back is provided with interlocking means for rotating the third locking member by interlocking with the rotation of the handle arm in such a way that the third locking member occupies the lock releasing position thereof when the handle arm is in the use position thereof, and that the third locking member occupies the locking position thereof when the handle arm is rotated to the storage position thereof.

* * * * *